US012663858B2

(12) United States Patent
Sengupta et al.

(10) Patent No.: US 12,663,858 B2
(45) Date of Patent: Jun. 23, 2026

(54) METHOD AND HEAD MOUNTED DISPLAY DEVICE FOR POSE ESTIMATION IN EXTENDED REALITY ENVIRONMENT

(71) Applicant: SAMSUNG ELECTRONICS CO., LTD., Suwon-si (KR)

(72) Inventors: Sarthak Sengupta, Bengaluru (IN); Rajat Kumar Jain, Bengaluru (IN); Sujoy Saha, Bengaluru (IN); Tarun Vijayanand Bagewadi, Bengaluru (IN); Rajas Jayant Joshi, Bengaluru (IN); Aditi Singhal, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/028,725

(22) Filed: Jan. 17, 2025

(65) Prior Publication Data

US 2025/0165063 A1 May 22, 2025

Related U.S. Application Data

(63) Continuation of application No. PCT/IB2024/060401, filed on Oct. 23, 2024.

(30) Foreign Application Priority Data

Oct. 25, 2023 (IN) .............................. 202341072612

(51) Int. Cl.
*G06F 3/01* (2006.01)
(52) U.S. Cl.
CPC .................................... *G06F 3/012* (2013.01)
(58) Field of Classification Search
CPC .................................................... G06F 3/012
See application file for complete search history.

(56) References Cited

U.S. PATENT DOCUMENTS 9,443,355 B2 9/2016 Chan et al.
11,694,409 B1 7/2023 Rahman et al.
(Continued)

FOREIGN PATENT DOCUMENTS

KR      10-2228279 B1    3/2021
WO      2022/144116 A1   7/2022

OTHER PUBLICATIONS

Yuan et al. "A Simple Self-Supervised IMU Denoising Method for Inertial Aided Navigation", IEEE Robotics and Automation Letters, 2023, vol. 8, No. 2, pp. 944-950 (7 pages total).
(Continued)

*Primary Examiner* — Chun-Nan Lin
(74) *Attorney, Agent, or Firm* — Sughrue Mion, PLLC

(57) ABSTRACT

There is provided a method for pose estimation of a Head Mounted Display (HMD) device. The method includes receiving motion data from one or more motion sensors provided on the HMD device, the motion data including relevant motion data and irrelevant motion data acquired at a time a user is interacting with at least one extended reality (XR) application using the HMD device, obtaining motion embedding vectors for the HMD device corresponding to the at least one XR application based on the relevant motion data corresponding to the at least one XR application, generating a filtered motion data based on the motion embedding vectors corresponding to the at least one XR application and the motion data from the one or more motion sensors, and estimating a pose of the HMD device based on the filtered motion data.

19 Claims, 21 Drawing Sheets

(56)     References Cited

U.S. PATENT DOCUMENTS

| | | |
|---|---|---|
| 2016/0260251 A1 | 9/2016 | Stafford et al. |
| 2020/0302655 A1* | 9/2020 | Oh ......................... G06T 9/001 |
| 2022/0020083 A1* | 1/2022 | Restorff ................ G06N 20/00 |
| 2022/0093063 A1 | 3/2022 | Lal et al. |
| 2023/0214027 A1 | 7/2023 | Erivantcev et al. |
| 2023/0215023 A1* | 7/2023 | Raghoebardajal ...... G06T 7/246 |
| 2023/0367386 A1* | 11/2023 | Wilson ................. G06T 19/006 |
| 2025/0078196 A1* | 3/2025 | Idapalapati ............ G06F 3/011 |

OTHER PUBLICATIONS

International Search Report and Written Opinion (PCT/ISA/210 and PCT/ISA/237) dated Feb. 17, 2025, issued by International Searching Authority in International Application No. PCT/IB2024/060401.
Kim et al., "Revisiting Image Pyramid Structure for High Resolution Salient Object Detection", Asian Conference on Comuputer Vision, Sep. 20, 2022, arXiv:2209.09475v3 [cs.CV], pp. 1-28 (28 pages total).
Brossard et al., "Denoising IMU Gyroscopes with Deep Learning for Open-Loop Attitude Estimation", IEEE Robotics and Automation Letters, Feb. 14, 2020, arXiv:2002.10718v2 [cs.RO] Jun. 26, 2020, pp. 1-9 (9 pages total).
Jiang et al., "A MEMS IMU De-Noising Method Using Long Short Term Memory Recurrent Neural Networks (LSTM-RNN)", Sensors, Oct. 15, 2018, vol. 18, No. 3470, doi:10.3390/s18103470, pp. 1-14 (14 pages total).
Engelsman et al., "Data-Driven Denoising of Stationary Accelerometer Signals", arXiv:2206.05937v2 [eess.SP], Measurements, Jun. 19, 2023, pp. 1-19 (19 pages total).

\* cited by examiner

S-1 at T1       S-2 at T2       S-3

| IMU sensor data 221 | → | IMU Refinement 223 | → | IMU Data correction 225 | → | Filtered IMU data 227 |

FIG. 8A

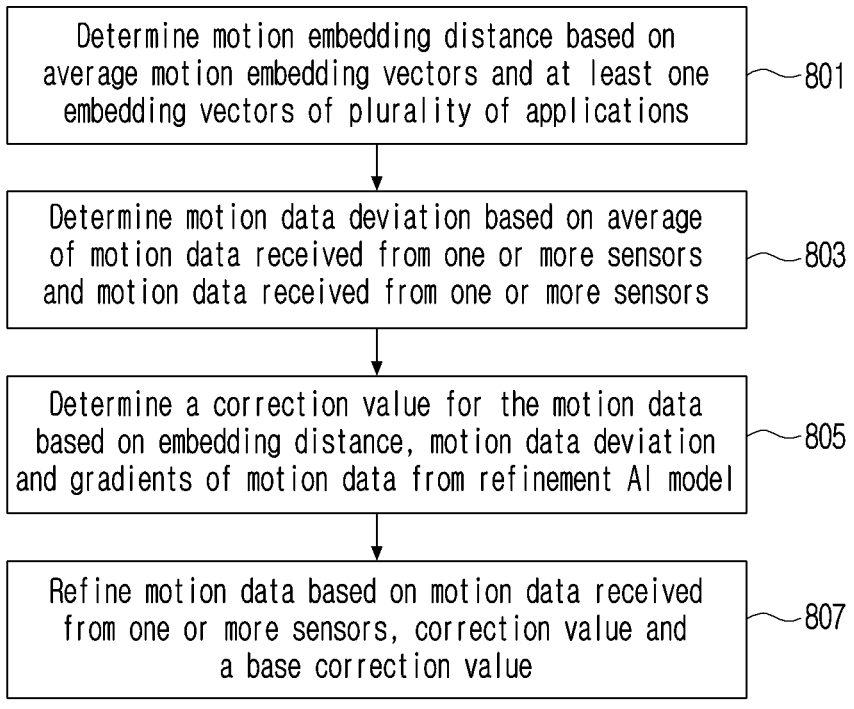

Determine motion embedding distance based on average motion embedding vectors and at least one embedding vectors of plurality of applications ~801

Determine motion data deviation based on average of motion data received from one or more sensors and motion data received from one or more sensors ~803

Determine a correction value for the motion data based on embedding distance, motion data deviation and gradients of motion data from refinement AI model ~805

Refine motion data based on motion data received from one or more sensors, correction value and a base correction value ~807

Trajectory with Noisy IMU Data

Expected Trajectory with
Our Refined IMU Data

Ground Truth Trajectory

FIG. 12

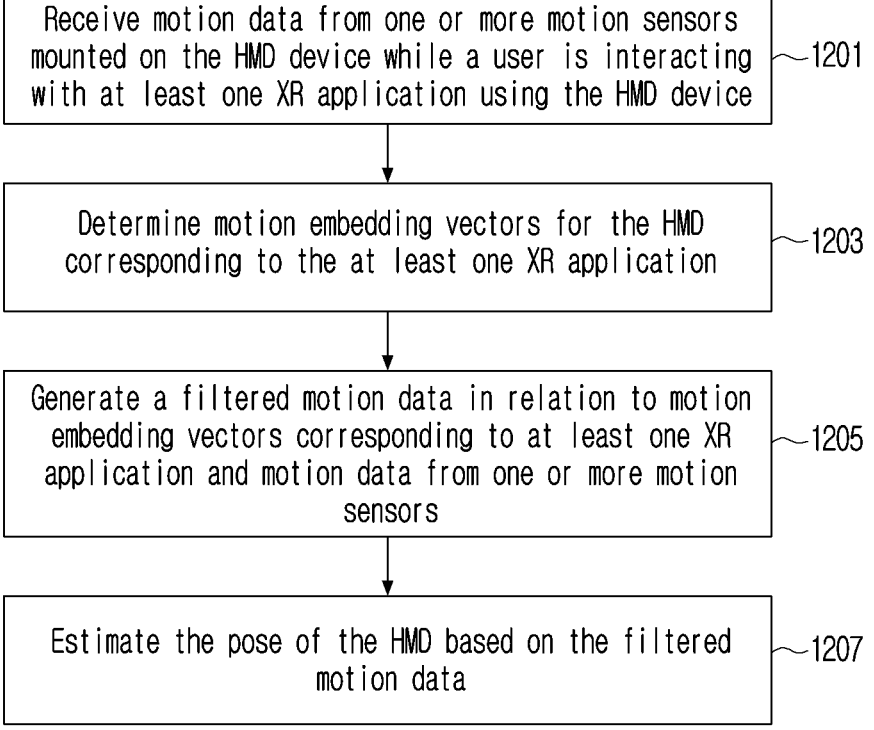

Receive motion data from one or more motion sensors mounted on the HMD device while a user is interacting with at least one XR application using the HMD device ~1201

Determine motion embedding vectors for the HMD corresponding to the at least one XR application ~1203

Generate a filtered motion data in relation to motion embedding vectors corresponding to at least one XR application and motion data from one or more motion sensors ~1205

Estimate the pose of the HMD based on the filtered motion data ~1207

METHOD AND HEAD MOUNTED DISPLAY DEVICE FOR POSE ESTIMATION IN EXTENDED REALITY ENVIRONMENT

CROSS-REFERENCE TO RELATED APPLICATION

This application is a bypass continuation of International Application No. PCT/IB2024/060401, filed on Oct. 23, 2024, which is based on and claims priority to Indian Patent Application number 202341072612, filed on Oct. 25, 2023, in the Intellectual Property India, the disclosures of which are incorporated by reference herein in their entireties.

BACKGROUND

1. Field

Embodiments of the disclosure relate to a device and a method in the field of Extended Reality (XR), and more particularly, to a method and head mounted display device for pose estimation in the XR environment.

2. Description of Related Art

In general, a Head Mounted Display (HMD) device is a virtual reality (VR) device that facilitates or provides virtual reality for the user. The HMD device can be worn by the user and the HMD device superimposes an image (e.g., a virtual image) on in a real world view of the user. For example, the device tracks poses of the user in real world and maps the poses of the user poses while using the various applications in the HMD device. The HMD device may be used in various areas including, but is not limited to, entertainment (e.g., playing video games), learning, aviation, engineering, medicine and the like.

According to a related art technique, pose estimation in an HMD device is performed based on one or more motion sensor data received from one or more motion sensors mounted on the HMD device. The one or more motion sensor data includes angular velocity received and acceleration of the HMD device. The angular velocity can be received from gyroscope and acceleration can be received from accelerometer. However, the motion sensor data are extremely noisy and have alignment issues, which leads to inaccurate pose estimation in the HMD device.

According to another related art technique pose estimation is performed by denoising and correcting gyroscope data and accelerometer data using machine learning models. However, the denoising and correction made to the one or more motion sensor data may still lead to the inaccurate pose estimation without the visual support.

According to yet another related art technique, pose estimation is performed by denoising the one or more motion sensor data based on the visual data received from the real world. However, the processing of noisy and erroneous motion sensor data with vision data may include additional errors, which leads to inaccurate pose estimation in HMD devices. Thus, there is a need for an improved method, device and system for pose estimation in the HMD device.

SUMMARY

One or more aspect of the disclosure, address the above-mentioned disadvantages or other shortcomings or at least provide a useful solutions to overcome the pose estimation problems.

Embodiments of the disclosure provide a method and HMD device for pose estimation in an extended reality environment. The HMD device may generate a filtered motion data based on received motion data and motion embedding vectors. The motion embedding vectors may indicate the relevant motion data for the HMD corresponding to the at least one application. Further, the HMD device estimates the poses of the HMD based on the filtered relevant motion data, which leads to the accurate pose estimation in the HMD devices. The device and method for pose estimation according to one more embodiments of the disclosure estimation according to one more embodiments of the disclosure leads to the increased stability and reliability of motion sensor data and enhanced functionality of the HMD device.

According to an aspect of the disclosure, there is provided a method for pose estimation of a Head Mounted Display (HMD) device, the method including: receiving motion data from one or more motion sensors provided on the HMD device, the motion data including relevant motion data and irrelevant motion data acquired at a time a user is interacting with at least one extended reality (XR) application using the HMD device; obtaining motion embedding vectors for the HMD device corresponding to the at least one XR application based on the relevant motion data corresponding to the at least one XR application; generating a filtered motion data based on the motion embedding vectors corresponding to the at least one XR application and the motion data from the one or more motion sensors; and estimating a pose of the HMD device based on the filtered motion data.

The motion embedding vectors are obtained by inputting, to a contrastive learning AI model, the motion data and application information corresponding to the at least one XR application.

The method may further include determining a pose error based loss between estimated pose and a ground truth pose acquired by the one or more motion sensors; and training a refinement artificial intelligence (AI) model based on the pose error based loss and the motion embedding vectors.

The refinement AI model may be a light weight model in comparison to a contrastive learning AI model.

The motion embedding vector may include floating point numbers that represent feature value indicating size of the motion embedding vector.

The application information may include a name of the at least one XR application, a category of the at least one XR application, or a version of the at least one XR application.

The contrastive learning AI model may include: obtaining a first embedding vector for a first application based on first motion data corresponding to the HMD device; obtaining a second embedding vector for a second application based on second motion data corresponding to the HMD device; obtaining a distance between the first embedding vector for the first application and the second embedding vector for the second application; and learning a degree of relativeness between the first application and the second application based on the distance between the first embedding vector for the first application and the second embedding vector for the second application.

The generating the filtered motion data may include: inputting the received motion data and the motion embedding vectors to the refinement AI model determining, by the refinement AI model, at least one motion embedding distance based on average motion embedding vectors and at least one embedding vectors of plurality of applications; determining, by the refinement AI model, at least one motion data deviation based on average of motion data received from the one or more motion sensors and the motion data received from the one or more motion sensors; determining a motion data correction value based on the at least one motion embedding distance, the at least one motion data deviation and gradients of motion data from the refinement AI model; determining an updated motion data correction value based on a base correction value and the motion data correction value, the base correction value determined using trained base refinement model based on previous motion data received from the one or more motion sensors; and generating, by the refinement AI model, the filtered motion data based on the motion data received from the one or more motion sensors and the updated motion data correction value.

According to another aspect of the disclosure, there is provided a Head Mounted Display (HMD) device including: a memory storing one or more instructions; one or more motion sensors; a processor connected to the memory and the one or more motion sensors; and a pose estimation controller connected to the processor and configured to: receive motion data from the one or more motion sensors, the motion data including relevant motion data and irrelevant motion data acquired at a time a user is interacting with at least one extended reality (XR) application using the HMD device; obtain motion embedding vectors for the HMD device corresponding to the at least one XR application based on the relevant motion data corresponding to the at least one XR application; generate a filtered motion data based on the motion embedding vectors corresponding to the at least one XR application and motion data from the one or more motion sensors; and estimate pose of the HMD device based on the filtered motion data.

The pose estimation controller may be further configured to: determine a pose error based loss between the estimated pose and a ground truth pose acquired by the one or more motion sensors; and train a refinement artificial intelligence (AI) model based on the pose error based loss and the motion embedding vectors.

The contrastive learning AI model is configured to: obtain a first embedding vector for a first application based on first motion data corresponding to the HMD device; obtain a second embedding vector for a second application based on second motion data corresponding to the HMD device; obtain a distance between the first embedding vector for the first application and the second embedding vector for the second application; and learn a degree of relativeness between the first application and the second application based on the distance between the first embedding vector for the first application and the second embedding vector for the second application.

The refinement of the motion data is a cost-effective solution for improving the accuracy and reliability of the motion data, since the filtered motion data can be achieved without the need for expensive hardware upgrades.

These and other aspects of the embodiments herein will be better appreciated and understood when considered in conjunction with the following description and the accompanying drawings. It is understood, however, that the following descriptions, while indicating example embodiments and numerous specific details thereof, are given by way of illustration and not of limitation. Many changes and modifications be made within the scope of the embodiments herein without departing from the spirit thereof, and the embodiments herein include all such modifications.

BRIEF DESCRIPTION OF DRAWINGS

These and other features, aspects, and advantages of the embodiments of the disclosure are illustrated in the accompanying drawings, throughout which like reference letters indicate corresponding parts in the various figures. The embodiments herein will be better understood from the following description with reference to the drawings, in which:

FIG. 8A is a flow chart illustrating a method of refining the motion data based the motion embedding vectors using refinement AI model according to an embodiment of the disclosure;

FIG. 12 is a flow chart illustrating a method for pose estimation of a HMD device in an XR environment according to an embodiment of the disclosure;

Figure 1A:
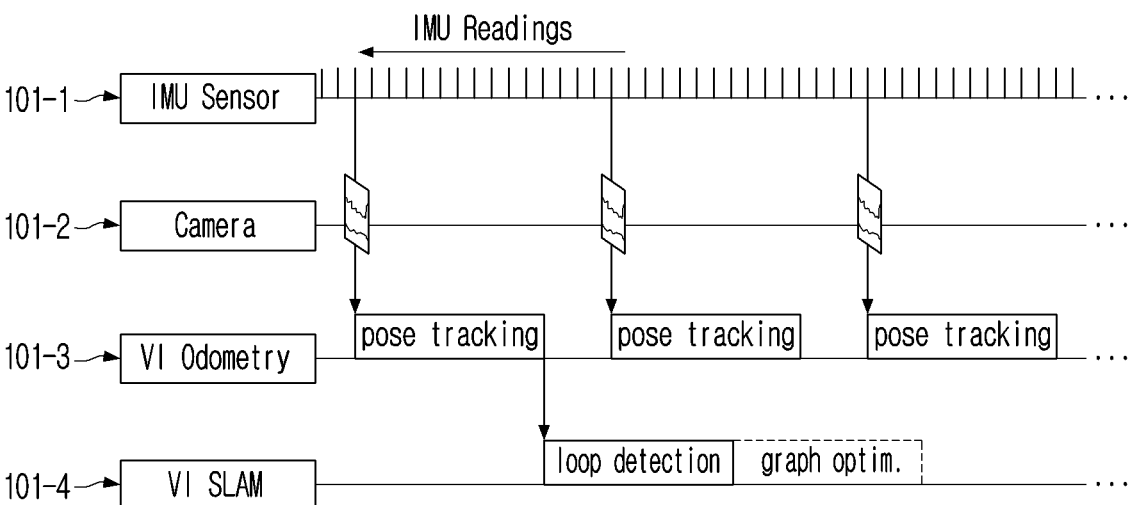
FIG. 1A is a schematic diagram of illustrating a scenario of pose estimation by combining inertial data and visual data according to related art.

It may be noted that to the extent possible, like reference numerals have been used to represent like elements in the drawing. Further, those of ordinary skill in the art will appreciate that elements in the drawing are illustrated for simplicity and may not have been necessarily drawn to scale. For example, the dimension of some of the elements in the drawing may be exaggerated relative to other elements to help to improve the understanding of aspects of example embodiments. Furthermore, the elements may have been represented in the drawing by conventional symbols, and the drawings may show only those specific details that are pertinent to the understanding the embodiments so as not to obscure the drawing with details that will be readily apparent to those of ordinary skill in the art having benefit of the description herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples are not be construed as limiting the scope of the embodiments herein.

As is traditional in the field, embodiments are described and illustrated in terms of blocks that carry out a described function or functions. These blocks, which referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and optionally be driven by firmware and software. The circuits, for example, be embodied in one or more semiconductor chips, or on substrate supports such as printed circuit boards and the like. The circuits constituting a block be implemented by dedicated hardware, or by a processor (e.g., one or more programmed microprocessors and associated circuitry), or by a combination of dedicated hardware to perform some functions of the block and a processor to perform other functions of the block. Each block of the embodiments be physically separated into two or more interacting and discrete blocks without departing from the scope of the proposed method. Likewise, the blocks of the embodiments be physically combined into more complex blocks without departing from the scope of the proposed method.

The accompanying drawings are used to help easily understand various technical features and it is understood that the embodiments presented herein are not limited by the accompanying drawings. As such, the proposed method is construed to extend to any alterations, equivalents and substitutes in addition to those which are particularly set out in the accompanying drawings. Although the terms first, second, etc. used herein to describe various elements, these elements are not be limited by these terms. These terms are generally used to distinguish one element from another.

One of the related art methods, relates to denoising Inertial Measurement Unit (IMU) gyroscopes with deep learning for open loop attitude estimation. In the related art method, a Convolutional Neural Network (CNN) computes gyro corrections and filters undesirable errors in the raw IMU data. The CNN model computes the gyro corrections based on past IMU measurements received from one or more IMU sensors. Further, an open loop time integration is performed on the noise free measurements for regressing the low frequency errors between ground truth and estimated orientation increments. Thus, in the related art method the denoising is performed merely based on the past IMU sensor data.

According to an embodiment of the disclosure, there is provided a method for denoising motion data from one or more motion sensors based on the motion embedding vectors and the motion data. The motion embedding vectors may be obtained by applying a contrastive learning on the motion data received from one or more motion sensors and application information received from one or more applications running on HMD device. The motion embedding vectors indicates the probable actions or motions while using a XR particular applications on the HMD device. Further, the received motion data, from one or more motion sensors, is filtered using a refinement artificial intelligence (AI) model based the motion embedding vectors, producing the most relevant motion data from the one or more received motion data. Moreover, an HMD pose using a SLAM technique is estimated based on the filtered motion data. Hence, the method of pose estimation, according to one or more embodiments, based on a filtered motion data provides a most accurate poses for HMD device than the related art techniques.

In some related art techniques, the pose estimation is performed using a Simultaneous Localization and Mapping (SLAM) module. The SLAM module is used to track the user movements in a scene by determining the user poses while using the HMD device. The SLAM module determines the user poses based on the measurements (e.g., raw IMU sensor data) from one more IMU sensors. The raw IMU sensor data is very noisy and hence denoising of the IMU sensor data is necessary for the pose estimation. Further, denoising is performed based on plurality of IMU sensor data captured from one or more IMU sensors. The denoising can be performed by using a self-supervised learning technique which learns the behavior of motion sensor data and denoises the received IMU sensor data based on the learned IMU sensor data. Thus, in the related art technique, the pose estimation is merely based on the past IMU sensor data.

Unlike the related art HMD devices, according to one or more embodiments of the disclosure, a controller of the HMD device may perform pose estimation based on the filtered motion data received from one or more motion sensors. The filtered motion data is determined based on the motion embedding vectors and the current motion data. The motion embedding vectors indicates the probable actions or motions while using a XR particular applications on the HMD device. Further, the received motion data from one or more motion sensors, is filtered using a refinement AI model based the motion embedding vectors, producing the most relevant motion data from the one or more received motion data. Finally, the filtered motion data is used for estimating HMD pose using a SLAM technique. Hence, the controller, according to one or more embodiments, accurately determines the HMD device poses based on a filtered motion data.

Figure 1B:
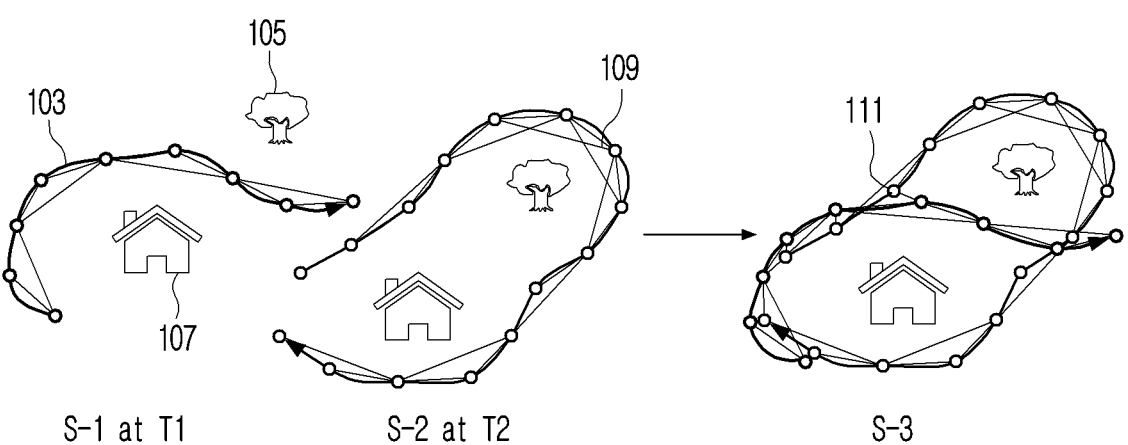
FIG. 1B is illustrating an exemplary scenario of loop detection technique using SLAM engine for pose estimation by combining inertial data and visual data according to related art.

FIGS. 1A and 1B are schematic diagrams for illustrating a scenario of pose estimation by combining inertial data and visual data according to related art.

Referring to FIG. 1A, in some of the related art methods, IMU readings (or measurements) are acquired from IMU sensor (101-1). The data from the IMU sensor (101-1) can be received at a rate of 1000 FPS (Frames Per Second). The IMU sensor (101-1) is an electronic device that measures and reports a specific force of body, angular rate, and sometimes the orientation of the body, using a combination of accelerometers, gyroscopes, and sometimes magnetometers. The IMU sensors detects linear acceleration using one or more accelerometers and rotational rate using one or more gyroscopes.

In some cases, the IMU sensors may be incorporated into Inertial Navigation Systems (INS), which utilize the raw IMU measurements to calculate attitude, angular rates, linear velocity, and position relative to a global reference frame. These IMU sensors are an integral part of all Visual Inertial SLAM Systems.

Behavior of gyroscope and accelerometer sensors are often represented by a model based on the following errors (assuming that the gyroscope and accelerometer sensors have the proper measurement range and bandwidth):

Offset error: this error can be split between stability performance (drift while the sensor remains in invariant conditions) and repeatability (error between two measurements in similar conditions separated by varied conditions in between);

Scale factor error: errors on first-order sensitivity due to non-repeatability and nonlinearities;

Misalignment error: due to imperfect mechanical mounting;

Cross-axis sensitivity: parasitic measurement induced by solicitation along an axis orthogonal to the sensor axis;

Noise: dependent on desired dynamic performance; and

Environment sensitivity: primarily sensitivity to thermal gradients and accelerations;

Thus, the IMU sensor data is a high-frequency data and very noisy data, which cannot be directly applied to the position tracking solutions. However, the raw IMU sensor data always needs an initial calibration and alignment. Further, the noise, bias, calibration and alignment related issues in the IMU sensor data readings lead to errors in pose estimation, and thus affect the tracking and localization of the user. Even with these corrections, the data cannot be used directly and needs visual support to get accurate results. Thus, the processing of this noisy and erroneous IMU data with vision data, adds additional error to the solutions such as SLAM.

Also, the IMU sensor data does not depend on visual features or lightning conditions. However, the IMU sensor data does not support re-localization and cannot maintain long-term information.

Referring back to FIG. 1A, a camera (101-2) can capture one or more video frames of the video. Further, the method includes preforming Visual Inertial (VI) odometry (101-3) based on the IMU sensor data received from IMU sensor data (101-1) and camera frames received from the cameras (101-2). Although one IMU sensor and one camera are shown in FIG. 1, the disclosure is not limited thereto, and as such, two or more IMU sensors and/or two or more cameras may be provided according to various embodiments. The VI odometry (101-3) is a method of estimating a change in position over a time. The VI odometry determines a pose of an object based on inertial data points and the visual data points. The inertial data point can be obtained from the IMU sensor data and the visual data point can be obtained from the camera frames received from the camera 101-2. For example, the VI odometry (101-3) determines a relative motion between the current camera frame and previous camera frame by integrating the inertial data point and the visual data point. Finally, The VI odometry (101-3) derives a pose based on the relative motion and the IMU sensor data.

Moreover, the method includes preforming VI SLAM (101-4) (Visual Inertial Simultaneous Localization and Mapping) to track pose of an object using visual data points and inertial data points. The VI SLAM also builds a map with global context based on the visual data points and inertial data points. The global context represents a known environment in which the user is located. The VI SLAM generates the map by mapping the user in already known environment with the inertial data point and visual data point. Finally, the pose of the user can be derived based on the generated map. Further, in some cases, a loop detection and relocalization can be used to reduce drift in trajectory estimated using VI SLAM. For example, FIG. 1B, illustrates an exemplary scenario of loop detection technique using SLAM engine for pose estimation by combining inertial data and visual data, according to related art. For example, the loop detection technique generates a trajectory (103) represented as a loop based on the inertial data points representing the motion of the user during a time T1. Further, trajectory (103) can be represented in the form of a map S-1, where the map S-1 can be visualized as the user is travelling nearby location such as a tree (105) and a house (107). Further, loop detection technique generates a trajectory (109) of the user represented as a loop based on the visual data points representing the motion of the user during time T2. Further, the trajectory (109) can be represented in the form of map S-2, where the map S-2 represents the nearby objects and the environment in which the user is travelling at time T2. Thereafter, the VI SLAM (101-4) combines the trajectory (103) (generated based on inertial data points (111)) and trajectory (109) (generated based on visual data points) to estimate optimal poses of the user and generate an optimal map S-3. The VI SLAM optimizes all the poses between the two timestamp (T1 and T2) to increase map consistency enabling accurate output in future when the same location is visited again.

Further, a graph optimization technique can be used by the VI SLAM for pose graph optimization. The pose graph may include camera frames, 2D features detected in the frames and 3D landmark for the 2D features. The graph optimization algorithm optimizes the complete pose graph by minimizing the re-projection error. In the graph-based SLAM, the poses of the are modeled by nodes in a graph and are further labelled with their positions in the environment. The graph-based optimization may include two stages. For example, the graph-based optimization may include a construction of graph and a determining pose based on the graph. The graph is constructed based on the raw measurement of the sensors configured to capture the details of the environment and the location. Finally, the pose estimation is performed by determining the edges represented in the graph. Thus, in the graph-optimization technique, the pose estimation is performed using the raw sensor measurements, and the pose estimation is less accurate because the raw sensor data is very noisy.

Figure 2A:
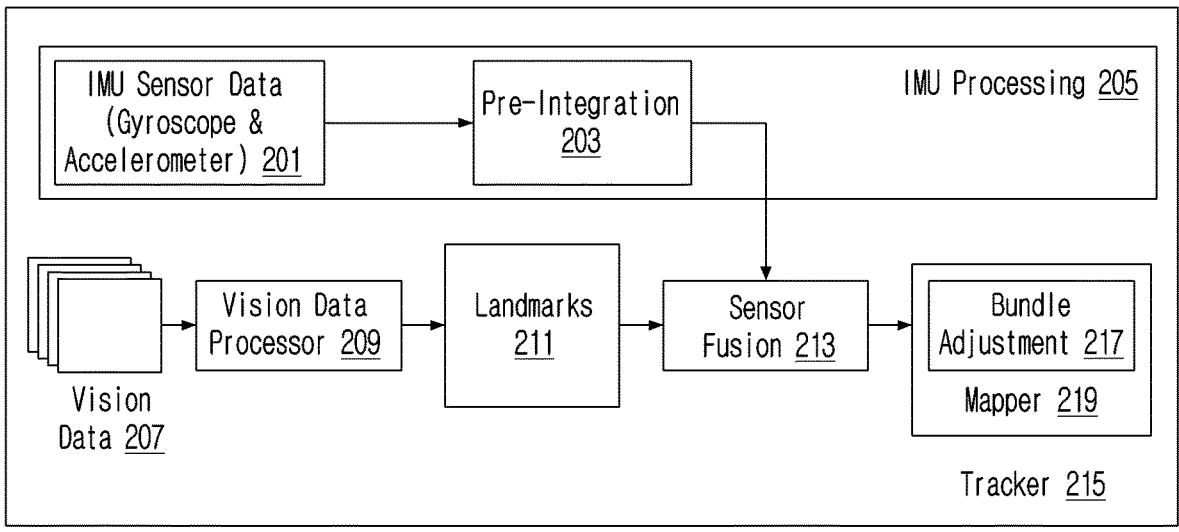
FIG. 2A is a block diagram illustrating the method of pose estimation using Visual Inertial Simultaneous Localization and Mapping (SLAM) according to related art.

FIG. 2A is a block diagram illustrating the method of pose estimation using Visual Inertial Simultaneous Localization 5 and Mapping (SLAM), according to related art.

FIG. 2A represents the method of pose estimation using related art VI SLAM approach. In the related art approach, the pose estimation is performed in three stages, including an IMU processing stage, a tracking stage and a mapping 10 stage. During, the IMU processing (205), the IMU sensor data is received from one or more IMU sensors (201). For example, the IMU sensors may include but is not limited to a gyroscope and an accelerometer. Also, for example, the IMU sensor data may include an angular velocity captured 15 from gyroscope and an acceleration received from accelerometer. The angular velocity may be represented as $\omega_j=(\omega_x, \omega_y, \omega_z)$ and acceleration may be represented as $\alpha_j=(\alpha_x, \alpha_y, \alpha_z)$. Further, the captured IMU sensor data is transmitted further to a pre-integration block (203). 20

At block (203), pre-integration of the one or more received IMU sensor data is performed. The pre-integration may be represented as shown in equation 1 below:

$$p^w_{b_{k+1}} = p^w_{b_k} + v^w_{b_k}\Delta t_k + \int\int_{t\in[t_k,t_{k+1}]} (R^w_t(\hat{a}_t - b_{a_t} - n_a) - g^w)dt^2$$

$$v^w_{b_{k+1}} = v^w_{b_k} + \int_{t\in[t_k,t_{k+1}]} (R^w_t(\hat{a}_t - b_{a_t} - n_a) - g^w)dt$$

$$q^w_{b_{k+1}} = q^w_{b_k} \otimes \int_{t\in[t_k,t_{k+1}]} \frac{1}{2}\Omega(\hat{\omega}_t - b_{w_t} - n_w)q^{b_k}_t dt,$$

$$\rightarrow P^{IMU}_j \in \{X_j, Y_j, Z_j, Q^x_j, Q^y_j, Q^z_j, Q^w_j\}$$

[Equation 1]

Upon pre-integration, the pre-integrated data is transmitted to sensor fusion block (213). The pre-integrated sensor data is fused vision data (207).

Also, during the processing of inertial data, the vision data (207) is also processed simultaneously. The vision data 40 (207) is provided as an input to the vision data processor (209). The vision data processor (209) processes the one or more vision data (207) received from the one or more cameras (101-2). Further, the vision data processor (209) determines 3D landmarks using at least one of an image 45 processing techniques. For example, the image processing techniques may include, but is not limited to, feature detection, depth estimation and optical flow. Thereafter, the processed vision data is fetched by the 3D landmarks block (211). The 3D landmarks block (211) represents the processed vision data as 3D landmarks determined for one or more vision data (207). Furthermore, a sensor fusion block (213) receives the 3D landmarks) and the processed IMU sensor data. Thereafter, the sensor fusion block (213) integrates the visual 3D landmarks data and the processed IMU 55 sensor data. During fusion operation, the fused visual data points and IMU sensor data points are tracked which results in a one or more tracker poses as indicated in equation 2 below:

$$P^{Tracker}_j \in \{X'_j, Y'_j, Z'_j, Q'_{xj}, Q'_{yj}, Q'_{zj}, Q'_{wj}\}$$

[Equation 2]

Further, at block (217), bundle adjustment of the one or 65 more tracker poses is performed. During the bundle adjustment at block (217), trajectory of the tracked poses is estimated. Further, a 3D map of the tracked poses is created based on the estimated trajectory. Finally, a mapped poses represented in 3D map can be represented as shown in equation 3 below:

$$P^{Mapper}_j \in \{X'_j, Y'_j, Z'_j, Q'_{xj}, Q'_{yj}, Q'_{zj}, Q'_{wj}\}$$

[Equation 3]

Hence, the SLAM model as shown in FIG. 2A estimates the poses by combining both the inertial data points and virtual data points. However, the combination of the visual data points and the inertial data points may include additional errors which leads to inaccurate pose estimation in HMD devices. Thus, there is a need for an improved method for pose estimation in an XR environment.

Figure 2B:
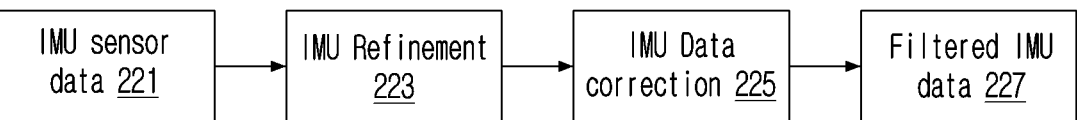
FIG. 2B is a block diagram illustrating refinement of an Inertial Measurement Unit (IMU) sensor data according to related art.

FIG. 2B is a block diagram illustrating refinement of IMU sensor data, according to related art. In some related art methods, as shown in FIG. 2B, IMU sensor data (221) is transmitted for refinement process by S-1. The IMU sensor data (221) can be a raw data received from one or more IMU sensors. The IMU sensor data (221) includes at least one of angular velocity and acceleration. For example, the angular velocity received from one or more IMU sensors are represented in the form of $w_j$ and the acceleration received from one or more IMU sensors are represented in the form of $\alpha_j$. The high frequency IMU data received from one or more IMU sensors (j, j+1, j+2 ... j+n) can be represented as $(\omega_j, \alpha_j, \omega_{j+1}, \alpha_{j+1}, \omega_{j+2}, \alpha_{j+2}, ... \omega_{j+n}, \alpha_{j+n})$. The IMU sensor data (221) is a high frequency sensor data and thus is noisy.

Further, the high frequency IMU sensor data (221) which includes the angular velocity $\omega_j=(\omega_x, \omega_y, \omega_z)$ and acceleration $\alpha_j=(\alpha_x, \alpha_y, \alpha_z)$ is transmitted to a IMU refinement block (223). At the IMU refinement block (223), the high frequency IMU sensor data (221) is filtered using an Artificial Intelligence (AI) refinement model. The AI refinement model is trained using the prior sequence of IMU sensor data. During the training the AI refinement model learns the patterns of the prior IMU data sequence. Further, the AI refinement model determines a correction value for the received high frequency IMU sensor data (221). The correction value of the angular velocity can be represented as $\Delta\omega_j$, where $\Delta\omega_j=(\omega_x, \omega_y, \omega_z)$. Similarly, the correction value of acceleration can be represented as $\alpha_j$, where. $\Delta\alpha_j=(\alpha_x, \alpha_y, \alpha_z)$. The determined correction value of the angular velocity and acceleration $(\Delta\omega_j, \Delta\alpha_j)$ is transmitted to an IMU data correction block (225). The IMU data correction block (225) performs the data correction of the received IMU sensor data based on the received correction value $(\Delta\alpha_j, \Delta\alpha_j)$ and thus generating a filtered IMU data (227). The IMU data correction block (225) performs data correction by adding the correction value with the received high frequency IMU sensor data (221) represented as $(\omega_j+\Delta\omega_j, \alpha_j+\Delta\alpha_j, w_{j+1}+\Delta\omega_{j+1}, \alpha_{j+1}+\Delta\alpha_{j+1}, \omega_{j+2}+\Delta\omega_{j+2}, \alpha_{j+2}+\Delta\alpha_{j+2}, \omega_{j+n}+\Delta\omega_{j+n}>\alpha_{j+n}+\Delta\alpha_{j+n})$. Finally, the result of the addition of correction value with the high frequency IMU sensor data (221) is determined to be a filtered IMU data (227). Hence, the exiting refinement model generates filtered IMU sensor data merely based on the prior sequences of the IMU sensor data, which leads to inaccurate pose estimation in the HMD device.

Figure 3:
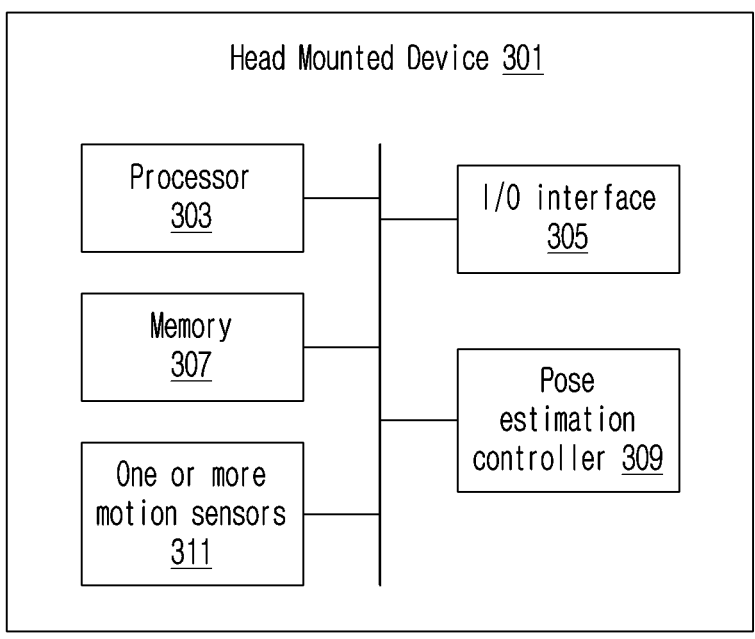
FIG. 3 is a block diagram of a Head Mounted Display (HMD) for pose estimation in an Extended Reality (XR) environment according to an embodiment of the disclosure.

FIG. 3 is a block diagram of a Head Mounted Display (HMD) for pose estimation in an Extended Reality (XR) environment according to an embodiment of the disclosure.

According to an embodiment, the Head Mounted Display (HMD) device (301) may include a processor (303), an input/output (I/O) interface (305), a memory (307), a pose estimation controller (309) and one or more motion sensors (311). However, the disclosure is not limited thereto, and as such, the HMD device (301) may include other components, such as, but is not limited to, communication interface/ circuit to communicate with an external device. The HMD device (301) is a visual device that can be worn on head and may include a display. The HMD device (301) may be used for at least one of virtual reality, augmented reality and mixed reality. The augmented reality is an interactive experience that enhances the real world with computer generated perceptual information. The virtual reality is a computer-generated environment with scenes and objects that appear to be real and immerses the user in the virtual environment. Mixed reality is a user environment in which the physical reality and digital content are combined such that an interaction is enabled between the real world and virtual objects. The HMD device (301) may include one or more motion sensors (311). The one or more motion sensors (311) is an electronic device which detects the movement of an object, such as the HMD device (301). According to an embodiment, the one or more motion sensors (311) may be provided on the HMD device (302). For example, the one or more motion sensors (311) may be mounted on the HMD device (302). According to an embodiment, the one or more motion sensors (311) associated with the HMD device (301) may include, but is not limited to gyroscope, accelerometer, magnetometer, and Inertial Measurement Unit (IMU) sensors. Further, the motion data is the data captured or measured by the one or more motion sensors (311). For example, the motion data may include, but is not limited to, acceleration (detected by the accelerometer), and angular velocity (detected by the gyroscope). The processor (303) of the HMD device (301) may be connected to the memory (307) and one or more motion sensors (311). Further, the memory (307) may be configured to store instructions to be performed by the processor (303). For example, the memory (307) may store program code or instruction set to be executed by the processor (303). Also, the memory (307) may store information (referred to as XR information for example) received from one or more Extended Reality (XR) application running on the HMD device (301). For example, the information of the XR application may include, but is not limited to, name of application, a category of application, and version of application. The XR application may be one of various types. For example, the XR application may be a stable application (such as word processing or spreadsheet applications), or dynamic application (such as gaming). According to an embodiment, the user of the HMD device (301) may interact with the XR application through the I/O interface (305). For example, the I/O interface (305) may include, but is not limited to, a keyboard, a joystick, a microphone, a touch panel, haptic devices, a speakers, a display, etc.

The memory (307) may include non-volatile storage elements. Examples of such non-volatile storage elements includes magnetic hard discs, optical discs, floppy discs, flash memories, or forms of Electrically Programmable Memories (EPROM) or Electrically Erasable and Programmable Memories (EEPROM). In addition, the memory (307) in some examples, be considered a non-transitory storage medium. The term "non-transitory" indicates that the storage medium is not embodied in a carrier wave or a propagated signal. The term "non-transitory" is not be interpreted that the memory (307) is non-movable. In some examples, the memory (307) is configured to store larger amounts of information. In certain examples, a non-transitory storage medium stores data that can, over time, change (e.g., in Random Access Memory (RAM) or cache).

The processor (303) may include one or a plurality of processors. The one or the plurality of processors is a general-purpose processor, such as a central processing unit (CPU), an application processor (AP), or the like, a graphics processing unit such as a graphics processing unit (GPU), a Visual Processing Unit (VPU), and/or an AI-dedicated processor such as a neural processing unit (NPU). The processor (303) may include a single core processor or a multi-core processor configured to perform the instructions stored in the memory (307).

The HMD device (301) may include the pose estimation controller (309). The pose estimation controller (309) may receive a motion data from one or more motion sensors (311). The one or more motion sensors (311) may include, but is not limited to, accelerometer, gyroscopes, and magnetometers. For example, the accelerometers may measure acceleration of the body or an object, gyroscope may measure angular velocity of an object, and magnetometer may measure the magnetic flux density. The one or more motion sensors (311) may be associated with the HMD device (301). Further, the pose estimation controller (309) determines a motion embedding vectors for the HMD (301) corresponding to the at least one XR application. The motion embedding vectors for the at least one XR application running in the HMD device (301) is determined using a contrastive AI learning model. The contrastive learning AI model learns motion embedding vectors for the at least one XR application based on the motion sensor data and application information of plurality of applications running on the HMD device (301). The contrastive AI learning model, thus determines a motion embedding vectors based on the received motion data and application information running on the HMD device (301). Furthermore, the pose estimation controller (309), generates a filtered motion data based on the determined motion embedding vectors and the received motion data. Finally, the pose estimation controller (309) estimates the pose of the HMD device (301) based on the filtered motion data. Hence, the estimation of the poses of the HMD device (301) based on the filtered motion data leads to most accurate pose estimation and thus enhancing the user experience while wearing the HMD device (301).

Figure 4A:
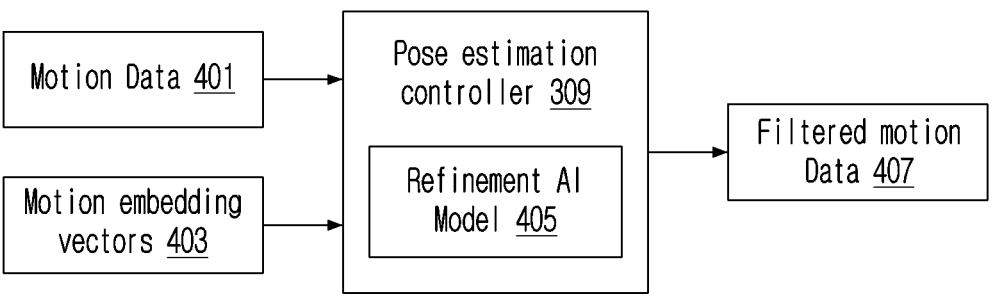
FIG. 4A is a high-level block diagram illustrating a refinement model for refining the motion data according to an embodiment of the disclosure.

FIG. 4A is a high-level block diagram illustrating a refinement model for refining the motion data according to an embodiment of the disclosure. According to an embodiment, the pose estimation controller (309) may be configured to refine motion data for accurate pose estimation in the HMD devices (301). However, the disclosure is not limited thereto, and as such, another component may refine the motion data for the accurate pose estimation. According to an embodiment, the pose estimation controller (309) may receive motion data (401) and motion embedding vectors (403). The motion data (401) may include, but is not limited to, at least one of acceleration and angular velocity. The motion data (401) received by the pose estimation controller (309) may include both relevant motion data and irrelevant motion data. Further, a refinement AI model (405) of the pose estimation controller (309) refines the received motion data (401) based on the received motion data (401) and the motion embedding vectors (403). The refinement AI model (405) may determine a correction value for the received motion data (401) based on the received motion data (401), motion embedding vectors (403), gradients from refinement model and base correction value. Further, the refinement AI model (405) may add the determined correction value with the received motion data (401) to generate a filtered motion data (407). Moreover, the pose estimation controller (309) may estimate the poses of the HMD device (301) based on the filtered motion data (407).

Figure 4B:
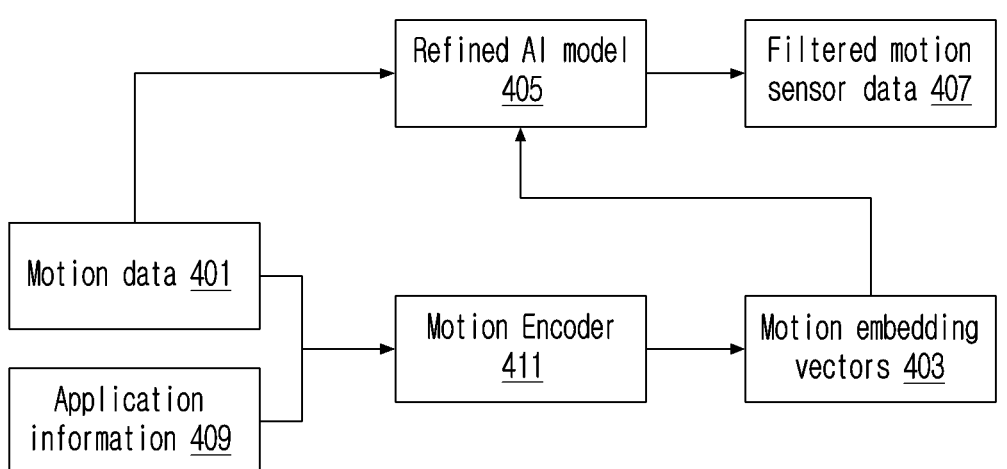
FIG. 4B is a detailed block diagram illustrating the generation of filtered motion data according to an embodiment of the disclosure.

FIG. 4B is a detailed block diagram illustrating the generation of filtered motion data according to an embodiment of the disclosure. FIG. 4B shows a detailed block diagram of the generation of the filtered motion data by a pose estimation controller (309). According to an embodiment, the pose estimation controller (309) may include a motion encoder (411) and a refinement AI model (405). The motion encoder (411) may receive a motion data (401) and an application information 409. The motion data (401) is received from one or more motion sensors (311) associated with the HMD device (301). The application information 409 is an information related to the application running on the HMD device (301). For example, the application information may include, but is not limited to, name of the application, application category (static/dynamic), and application version. Upon receiving the motion data (401) and the application information 409, the motion encoder (411) may determine motion embedding vectors (403). The motion embedding vectors (403) may be determined using a AI model. For example, the motion encoder may generate the motion embedding vectors (403) using a contrastive learning AI model as shown in FIG. 6A.

Figure 6A:
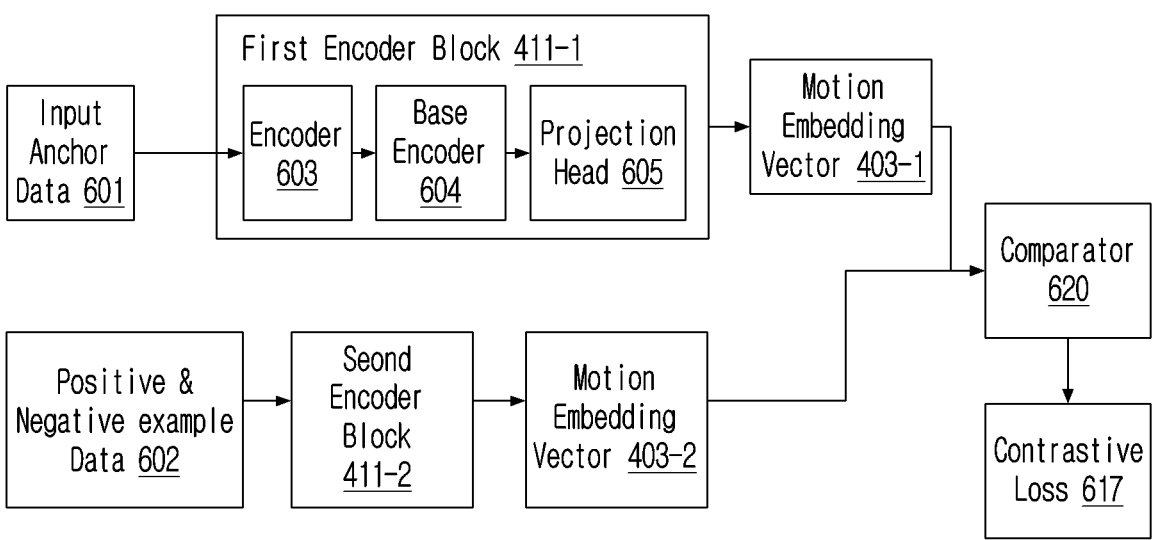
FIG. 6A is a detailed block diagram illustrating a contrastive learning of motion data using motion encoder according to an embodiment of the disclosure.
Figure 6B:
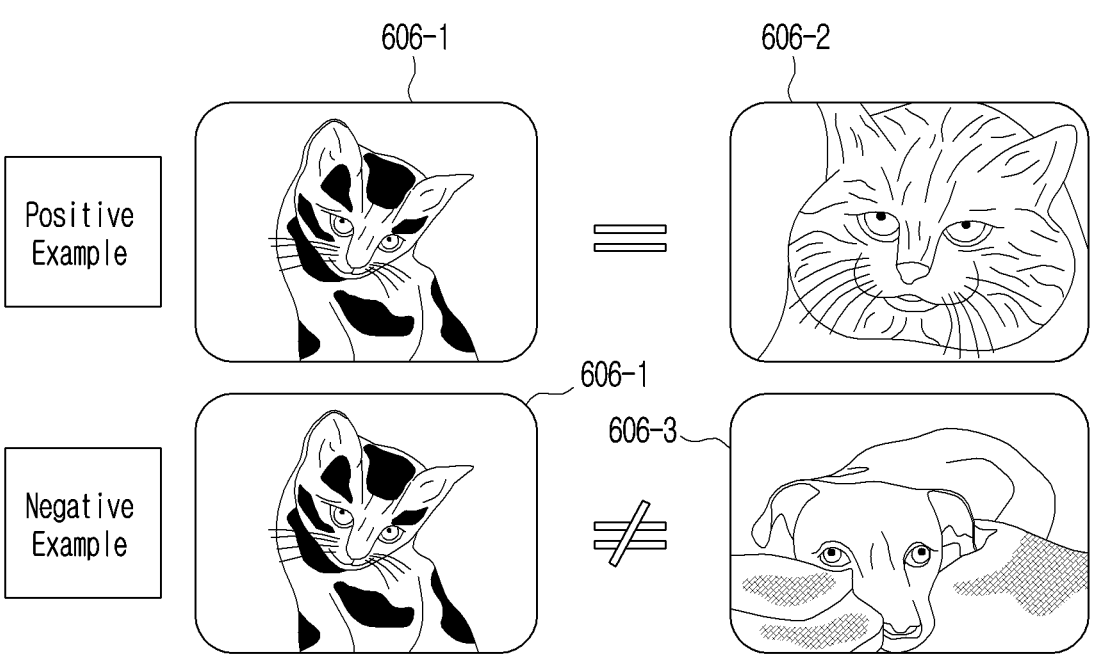
FIG. 6B illustrates an exemplary outcome for contrastive learning according to an embodiment of the disclosure.

FIG. 6A is a detailed block diagram illustrating a contrastive learning of motion data using motion encoder according to an embodiment of the disclosure. The contrastive learning is a machine learning model, which is used to learn the general features of a dataset without labels by teaching the model the data points that are similar or and the data pointes that are different. For example, the contrastive learning model looks at pairs of data points that are "similar" and "different" in order to learn higher-level features about the data, before performing operations such as classification or segmentation. According to an embodiment, a first encoder block (411-1) may include an encoder (603), a base encoder (604) and a projection head (605). In contrastive learning, the encoder block (603) may receive input anchor data (601) and encode the input anchor data (601). The input anchor data (601) is an input data, which includes, but is not limited to, a plurality of unlabelled images or videos. Further, a base encoder (604) may perform base encoding, where the input anchor data (601) is encoded to an inter-mediate representation. Upon completion of the base encoding, the projection head (605) may project the intermediate representation to a common high-dimensional space and determine current motion embedding vectors (403-1) for the input anchor data (601). The current motion embedding vectors (403-1) may include a list of floating-point numbers that represent feature values indicating size of the current motion embedding vectors (403-1). Also, the contrastive learning may include comparing the current motion embedding vectors (403-1) with already trained motion embedding vectors (403-2). For example, a comparator 620 may compare the current motion embedding vectors (403-1) with already trained motion embedding vectors (403-2) and output a contrastive loss (617). The already trained motion embedding vectors (403-2) may be generated during training of a second encoder block (411-2) with some of the as positive and negative example data 602 as input. For example, some sample positive data and negative data may be provided to the second encoder block (411-2) during training is as shown in FIG. 6B. The positive data may represent similar features in one or more images or videos having common data points. For example, image (606-1) is a cat and image (606-2) is also a cat. On the other hand, the negative data may include dissimilar features in one or more images or videos having very less or no common data points. For example, image (606-1) is a cat and image (606-3) is a dog. Further, during the training, the distance between embedding vectors is determined to measure the similarity or dissimilarity. The second encoder block (411-2) determines the pair of images being similar when the distance between embedding vectors is low. Similarly, the second encoder block (411-2) determines the pair of images being dissimilar when the distance between embedding vectors is determined to be high.

Figure 6C:
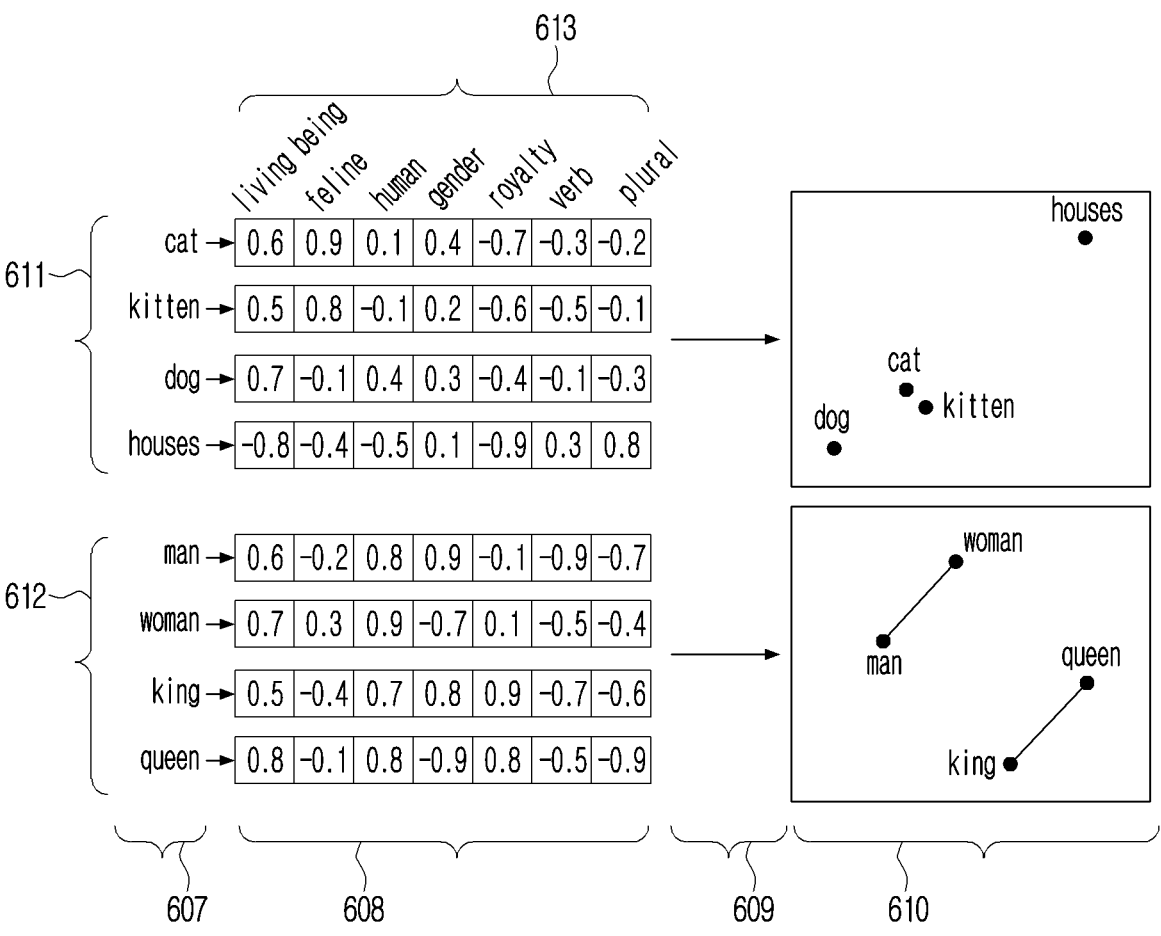
FIG. 6C illustrates an exemplary representation of similarity and dissimilarity between motion embedding vectors resulted from contrastive learning according to an embodiment of the disclosure.

Further as shown in FIG. 6C, the similarity and dissimilarity are determined based on several characteristic features of the input data. In an example scenario (611) illustrated in FIG. 6C, the one or more input data (607) includes cat, kitten, dog, and houses. Further the input data (607) is compared with several characteristic features (613) such as living being, feline, human, gender, royalty, verb and plural. The first encoder block (411-1) and the second encoder block (411-2) may determine the motion embedding features (608) based on the input data (607) and the input characteristic features (613). For example, the motion embedding features (608) are values in the table, each of the values corresponding to the input data (607) and the input characteristic features (613). Based on the motion embedding features (608), motion embedding vectors (609) may be generated. Upon the generation of the motion embedding vectors (609), a 2D map (610) may be generated to represent the similarity and dissimilarity between the input data (611). The map represents the data points of cat and kitten to be close to each other since the embedding vectors of the cat and kitten are very close. However, the data points for houses and dog is away from cat and kitten which represents the dissimilarity. The distance between the two embedding vectors measures similarity and dissimilarity of the input data. Similarly, in an example scenario (612), the input data may include man, woman, king and queen. In this example case, the second motion encoder (411-2) generates a 2D map (610) representing the distance between the man-woman and king-queen. The distance between the motion embedding vectors (403) represents the similarity and dissimilarity. For example, if the distance is high, then the similarity is less. On the other hand, if the distance is low, then the similarity is high. Furthermore, the similarity and dissimilarity between the embedding vectors (403-1) and (403-2) may be determined by calculating the contrastive loss (617). The contrastive loss (617) indicates the degree of similarity and dissimilarity. For example, lesser the contrastive loss, higher the similarity between the embedding vectors (403-1), (403-2). Moreover, higher the contrastive loss, the similarity between the embedding vectors (403-1), (403-2) is lower. As such, the contrastive loss and the similarity is inversely correlated.

Figure 6D:
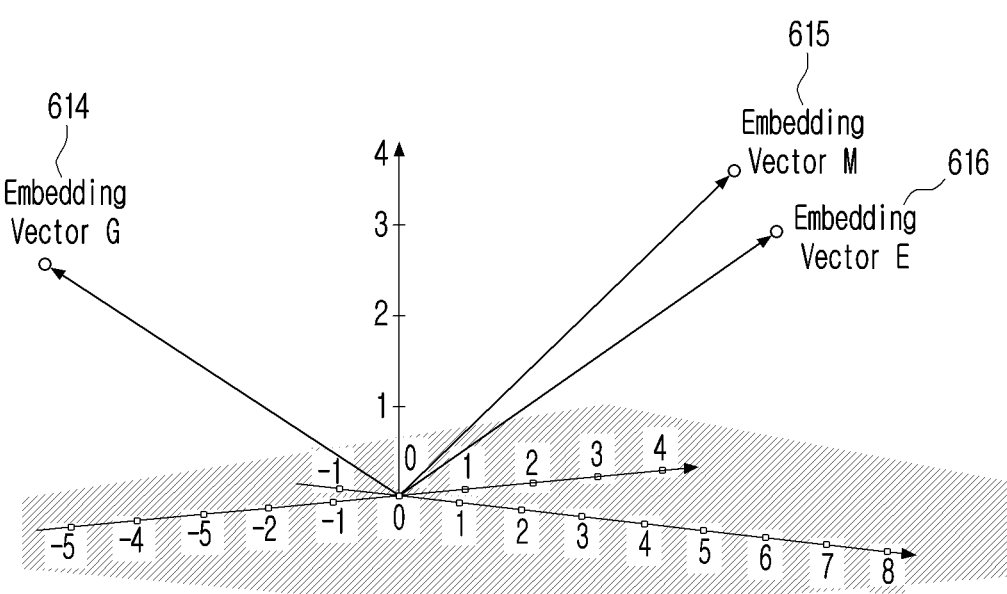
FIG. 6D illustrates an exemplary graphical representation of the outcome of contrastive learning of motion data in motion encoder according to an embodiment of the disclosure.

In some embodiments, the distance between the motion embedding vectors (403) may be represented in a graphical representation as shown in FIG. 6D. In FIG. 6D, there are three embedding vectors determined namely embedding vector M ((614)), embedding vector E (615) and embedding vector G (616). According to the graphical representation the distance between the embedding vectors M (615) and embedding vector E is (616) is less, hence the data may be determined to be similar. However, the distance between embedding vector G (614) and embedding vector M (615), embedding vector E (616) is more, hence the data may be determined to be dissimilar.

According to an embodiment of the disclosure, referring to FIG. 4B, the motion encoder (411) may receive motion data (401) and application information (409) from the HMD device (301). The motion encoder (411) may determine the motion embedding vectors (403) with respect to the various application parameters such as application name, application category and application version. Further, the motion encoder (411) may compare the determined motion embedding vectors (403) with respect to the motion embedding vectors of the similar applications. Moreover, the motion encoder (411) may determine the motion embedding vectors (403) of all the similar application of the received application information.

Further, the determined motion embedding vectors (403) of similar applications may be provided to the pose estimation controller (309). The pose estimation controller (309) may generate a filtered motion data based on the received motion embedding vectors and the received motion data (401). The pose estimation controller may refine the motion data (401) using a refinement AI model (405) and generate a filtered motion data (407).

Figure 7:
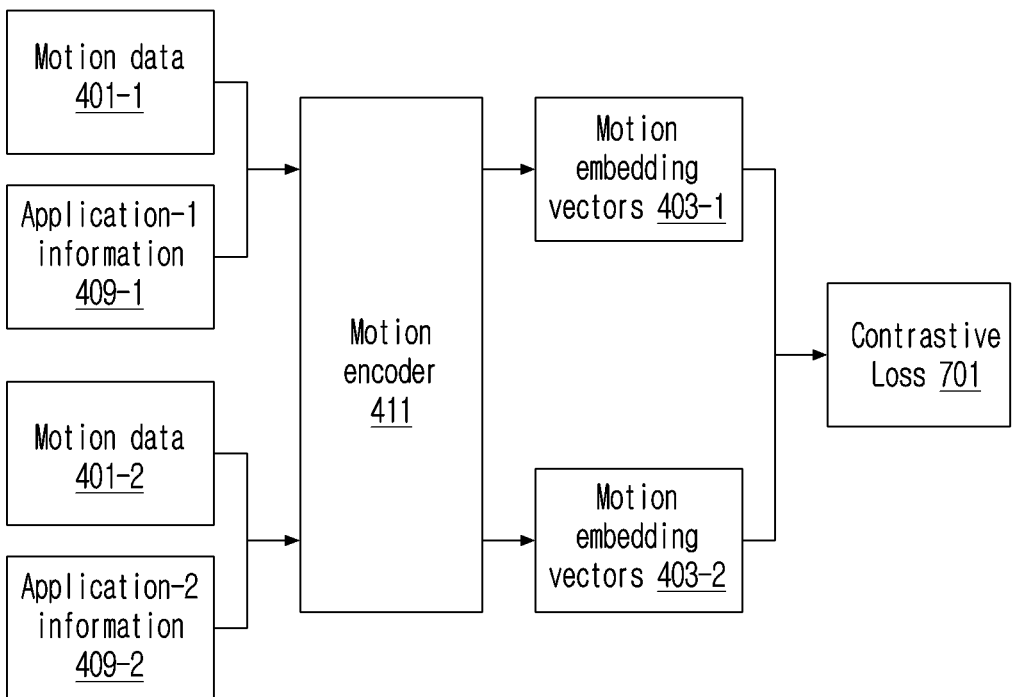
FIG. 7 illustrates an exemplary block diagram of training the motion data with application information to determine contrastive loss between the two or more XR applications executed in HMD device according to an embodiment of the disclosure.

FIG. 7 illustrates an exemplary block diagram of training using motion data with application information to determine contrastive loss between the two or more XR applications executed in HMD device (301) according to an embodiment of the disclosure. For example, during the training, a motion encoder (411) may receive input data set including motion data (401-1) and application information (409-1) of the application 1, and motion data (401-2) and application information (409-2) of application 2. For example, the motion encoder (411) may receive the motion data (401-1) and the application information (409-1) of the application 1, and the motion data (401-2) and application information (409-2) of application 2 together as part of the input data set. However, the disclosure is not limited thereto, and as such, according to another embodiment, the motion encoder (411) may receive the motion data (401-1) and the application information (409-1) of the application 1 separately from the motion data (401-2) and application information (409-2) of application 2. Further, the motion encoder (411) may determine first motion embedding vectors (403-1) corresponding to application 1 and second embedding vectors (403-2) corresponding to application 2. The first motion embedding vectors (403-1) and the second embedding vectors (403-2) represent possible motions or actions taken by the user while using the respective XR application in the HMD device (301). Thereafter, a contrastive loss between the first motion embedding vectors (403)- and the second embedding vectors (403)-2 may be determined to indicate similarity and dissimilarity between the application 1 and application 2. The contrastive loss may be determined using equation 4 shown below:

$$\ell_{i,j} = -\log \frac{\exp\left(sim(z_i, z_j)/\tau\right)}{\sum_{k=1[k\neq i]}^{2N} \exp\left(sim(z_i, z_k)/\tau\right)} \qquad \text{[Equation 4]}$$

As shown in equation 4, the exp indicates the exponential operation, sim (x,y) indicates the contrastive loss determined based on cosine similarity between inputs (Zi and Zj). The contrastive loss may be determined by calculating the logarithmic (base 2) of exponential of cosine similarity between the inputs.

For example, the application 1 is a "Microsoft Word" and application 2 is a "Microsoft Excel", then the contrastive loss is determined to be small. Similarly, if the application 1 is "Microsoft word" and application 2 is a "gaming application" then contrastive loss is determined to be high. Thus, lesser the contrastive loss, then application 1 and application 2 are more similar the applications. Also, higher the contrastive loss, then application 1 and application 2 are less/not similar. Although FIG. 7 illustrates an example embodiment with one motion encoder 411, the disclosure is not limited thereto, and as such, the motion encoder 411 may include two or more motion encoders configured to receive motion data and application information. For example, the encoder 411 may include a first motion encoder configured to receive the motion data (401-1) and the application information (409-1) of the application 1, and a second motion encoder configured to receive the motion data (401-2) and application information (409-2) of application 2. According to an embodiment, the first motion encoder may be same or similar to the first encoder block (411-1) illustrated in in FIG. 6A and the second motion encoder may be same or similar to the second encoder block (411-2) illustrated in FIG. 6A.

Figure 5:
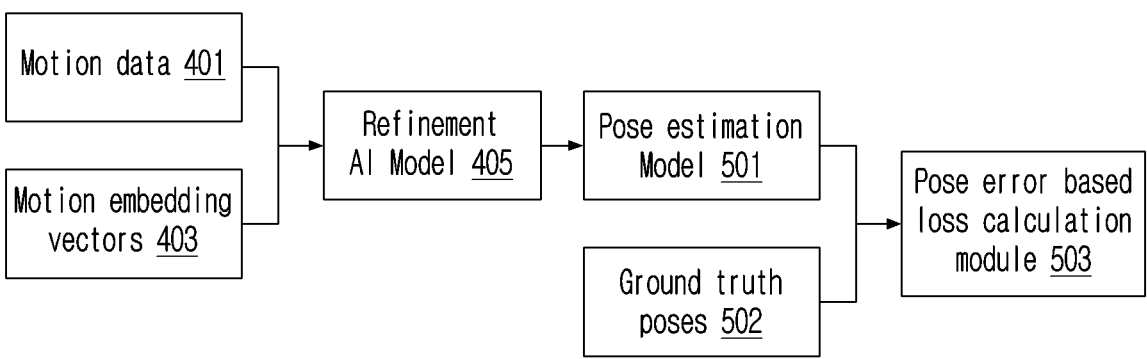
FIG. 5 is a block diagram illustrating pose estimation using the filtered motion data according to an embodiment of the disclosure.

FIG. 5 is a block diagram illustrating pose estimation using the filtered motion data according to an embodiment of the disclosure. As shown in FIG. 5, initially a refinement AI model (405) receives the motion data (401) and motion embedding vectors (403). The motion data (401) is received from one or more motion sensors (311) associated with the HMD device (301) and further the motion data (401) may be represented as $(\omega_j, \alpha_j, \omega_{j+1}, \alpha_{j+1}, \omega_{j+2}, \omega_{j+2}, \ldots \omega_{j+n}, \alpha_{j+n})$. Also, the motion embedding vectors (403) may be received from the motion encoder (411) and further the motion embedding vectors (403) is represented as $E_0, E_1, E_2 \ldots$ En. Further the refinement AI model (405) refines the received motion data (401) based on at least one of motion data (401) and motion embedding vectors (403). Further, the filtered motion data is transmitted to a pose estimation model (501). The pose estimation model (501) estimates the poses of the HMD devices (301) based on the filtered motion data. The estimate poses is represented as $$P_j^{IMU}$$

$\in = \{X_j, Y_j, Z_j, Q^x_j, Q^y_j, Q^z_j, Q^w_j\}$. The pose estimation model may estimate the poses of the HMD device (301) using a SLAM technique based on the filtered motion data. Furthermore, the pose estimation model transmits the estimated poses to a pose error loss calculation module (503). Finally, pose error-based loss calculation module (503) determines the pose error loss based on the estimated poses and ground truth poses, where the ground truth poses is represented as $$P_j^{GT}$$

$\in \{X_j, Y_j, Z_j, Q^x_j, Q^y_j, Q^z_j, Q^w_j\}$. The pose error based loss calculation module (503) is trained with an Mean Squared Error (MSE) loss of the pose error between the estimated pose and the ground truth pose captured using a motion capture system. Also, the pose error based loss is back-propagated to minimize pose error and hence learn the refinement of the motion data based on the provided motion embedding vectors (403).

FIG. 8A is a flow chart illustrating a method of refining the motion data based the motion embedding vectors using refinement AI model according to an embodiment of the disclosure.

According to an embodiment, in operation 801, refinement AI model (405) determines motion embedding distance based on average motion embedding vectors and at least one embedding vectors of plurality of applications. The average motion embedding vectors represents the mean value of the motion embedding vectors corresponding to at least one XR application.

According to an embodiment, in operation 803, the refinement AI model (405), determines motion data deviation based on average of motion data received from one or more motion sensors (311) and motion data (401) received from one or more motion sensors (311). The average motion data represents a mean value of motion data received from one or more motion sensors (311).

According to an embodiment, in operation 805, the refinement AI model (405) determines a correction value for the motion data (401) based on embedding distance, motion data deviation and gradients of motion data from refinement AI model. The gradients of the motion data may represent the change in refinement required due to change in the motion embedding vectors (403).

According to an embodiment, in operation 807, the refinement AI model (405), refines the received motion data (401) based on the received motion data (401), correction value and a base correction value. The base correction value indicates the correction value determined by a base refinement model. The base refinement model determines a correction value for the motion data (401) based on prior sequences of the motion data (401).

Figure 8B:
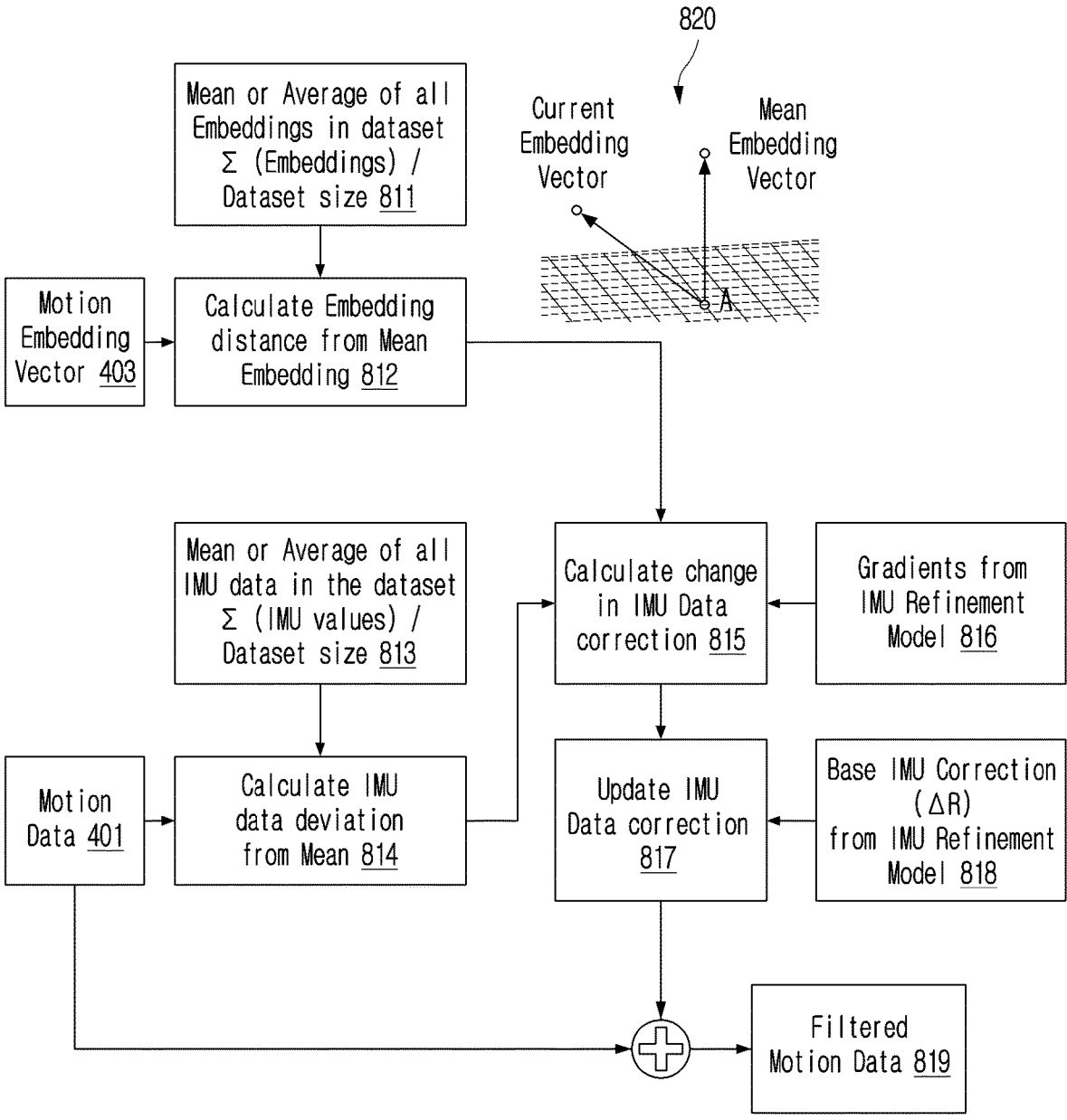
FIG. 8B is a block diagram illustrating the method of refining the motion data based the motion embedding vectors using refinement AI model according to an embodiment of the disclosure.

FIG. 8B is a block diagram illustrating the method of refining the motion data based the motion embedding vectors using refinement AI model according to an embodiment of the disclosure;

According to an embodiment, in operation 811, the refinement AI model (405) determines a mean or average of all the motion embedding vectors (403). For example one or more motion embedding vectors is represented as $(E_0, E_1, \ldots, E_n)$. The mean of motion embedding vectors is determined using equation 5 shown below:

$$\text{Mean/average motion embedding vector} = \Sigma\text{Embeddings } (E_0, E_1, \ldots E_n)/\text{Dataset size}(n) \qquad [\text{Equation } 5\pi]$$

According to an embodiment, in operation 812, the refinement AI model (405) determines an embedding distance based on the average motion embedding vectors and the motion embedding vectors (403). The embedding distance may be represented as $\partial E_j'$, where $\partial E_j'$ indicates the distance between the average motion embedding vectors with each of the motion embedding vectors $(E_0, E_1, \ldots, E_n)$. The embedding distance between the mean embedding vector and current embedding vector is represented in the form of graph 820.

According to an embodiment, in operation 813, the refinement AI model (405) determines a mean or average of motion data (401) received from one or more motion sensors (311). For example, the motion data is represented in the form of $(\omega_j, \alpha_j, \omega_{j+1}, \alpha_{j+1}, \omega_{j+2}, \alpha_{j+2}, \ldots \omega_{j+n}, \alpha_{j+n})$. Where $I=(\omega_j, \alpha_j)$. The mean or average of the motion data (401) may be determined using equation 6 shown below:

$$\text{Mean of motion data} = \Sigma(\text{IMU values})/\text{Dataset size} \qquad [\text{Equation } 6]$$

According to an embodiment, in operation 814, the refinement AI model (405) determines motion data deviation based on the mean of the motion data and received motion data (401). The motion data deviation represents the deviation between the motion data (401) and the mean motion data. The motion data deviation may be represented as $\partial I_j'$.

According to an embodiment, in operation 815, the refinement AI model (405), calculates a motion data correction value based on the embedding distance $\partial E_j'$, motion data deviation $\partial I_j$ and gradients of motion data. The gradients of motion data may be determined by an IMU refinement model in operation 816. The gradients of motion data may be represented in the form of $(\partial R_j/\partial I_0, \partial R_j/\partial E_0, \partial R_{j+1}/\partial I_1, \partial R_{j+1}/\partial E_1, \ldots \partial R_{j+n}/\partial I_n, \partial R_{j+n}/\partial E_n)$. The gradients of the motion data represent the change in refinement required due to change in the motion embedding vectors (403). For example, $\partial R_j/\partial I_0$ represents a symbol for partial derivate which further represents the small difference in refinement required due to any small change in motion data. Similarly, $\partial R_j/\partial E_0$ represents a symbol for partial derivative which represents the small difference in refinement required due to any small change in the motion embedding vectors (403). Further, the motion data correction value is determined using equation 7 shown below:

$$\partial R_j = \partial I_j' \times \partial R_j/\partial I_j + \partial E_j' \times \partial R_j/\partial E_0 \qquad [\text{Equation } 7]$$

According to an embodiment, in operation 817, the refinement AI model (405), updates the determined motion data correction value $\partial R_j$ based on the base correction value. The base correction value may be determined by a base refinement model in operation 818. The base refinement model determines the correction value for the motion data (401) based on the past sequences of the motion data $(\Delta\omega_j, \Delta\alpha_j)$. The base correction value may be represented as $R_j$, where $R_j = \Delta\omega_j, \Delta\alpha_j$. Thereafter the base correction value $R_j$ is added with the determined correction value $\partial R_j$ to generate an updated motion data correction value which is represented as $R_j + \partial R_j$.

According to an embodiment, in operation 819, the refinement AI model generates a filtered motion data by summing up the motion data (401) with the updated motion data correction value $R_j + \partial R_j$. The filtered motion data may be represented as $(\omega_j + \Delta\omega_j, \alpha_j + \Delta\alpha_j), (\omega_{j+1} + \Delta\omega_{j+1}, \alpha_{j+1}, + \Delta\alpha_{j+1}), (\omega_{j+2} + \Delta\omega_{j+2}, \alpha_{j+2} + \Delta\alpha_{j+2}), \ldots (\omega_{j+n} + \Delta\omega_{j+n}, \alpha_{j+n} + \Delta\alpha_{j+n})$.

Figure 9:
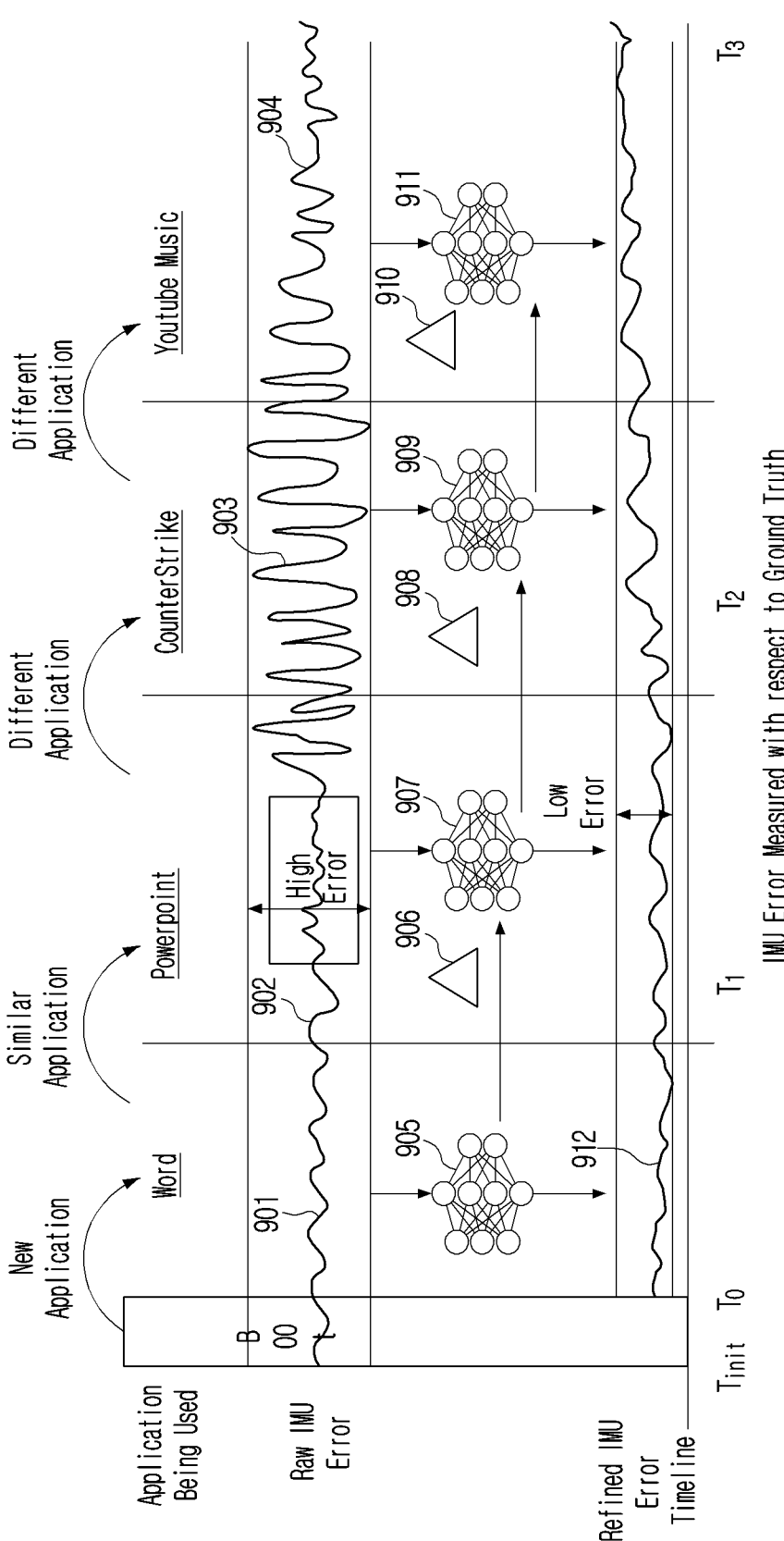
FIG. 9 illustrates an exemplary graphical representation of transitions of using the various applications in HMD device and the corresponding change in motion embedding vectors with respect to the transitions according to an embodiment of the disclosure.

FIG. 9 illustrates an exemplary illustrates an exemplary graphical representation of transitions of using the various applications in HMD device (301) and the corresponding change in motion embedding vectors with respect to the transitions according to an embodiment of the disclosure. For example, between time $T_0$ and $T_1$, the first application that is used in the HMD device (301) is the "Microsoft word". Further, the upon the completion, at time $T_{i+1}$ to $T_2$ an application 2 (e.g., "Power Point") is running. The error in the motion data received from one or more motion sensors (311) while running the "Microsoft word" application is represented as (901). Similarly, the error in the motion data received from one or more motion sensors (311) while running "Power Point" is represented as (902). Thereafter, the refinement AI model of the HMD device (301) determines distance between the motion embedding vectors of application 2 and application 1, and the determined distance is low and thus the application 1 and application 2 are similar applications and include similar motion embedding vectors. The neural network representation of refinement AI model is indicated as (907). Hence, the refinement AI model needs to perform changes in less number of parameters during the refinement process. The delta (906) indicates the amount of change in the parameters required to be performed by the refinement model. Also, the filtered pose error determined (912) is less since the pose estimation is determined based on the filtered IMU motion data, where the filtered motion data is determined based on the similarity and distance between the motion embedding vectors of both the applications.

Further, between time $T_{2+i}$ to $T_3$ an application 3 (e.g., CounterStrike) is running on the HMD device (301). The error in the motion data received from one or more motion sensors (311) while running "counterstrike" application is shown as (903). The distance between the embedding vectors of application 2 and application 3 is determined to be more and thus both the applications may be less similar or dissimilar embedding vectors. The neural network representation of refinement AI model for refining the motion data received from one or more motion sensors (311) while running the "counterstrike" application is indicated as (909). Hence, the refinement AI model needs to perform changes in more number of parameters during the refinement process. The delta (908) indicates the amount of change in the parameters required to be performed by the refinement model. Further, pose error 912 determined is less since the pose estimation is based on the filtered motion data.

Furthermore, between time $T_{3+i}$ to $T_n$, an application 4 (e.g., Youtube) is running on the HMD device (301). The distance between the embedding vectors of application 3 and application 4 is determined to be moderate and thus both the applications may include some similar embedding vectors. The neural network representation of refinement AI model is indicated as (911). Hence, the refinement AI model needs to perform changes in moderate number of parameters during the refinement process. The delta (910) indicates the moderate amount of change in the parameters required to be performed by the refinement model. Further, pose error 912 determined is less since the pose estimation is based on the filtered motion data.

Figure 10A:
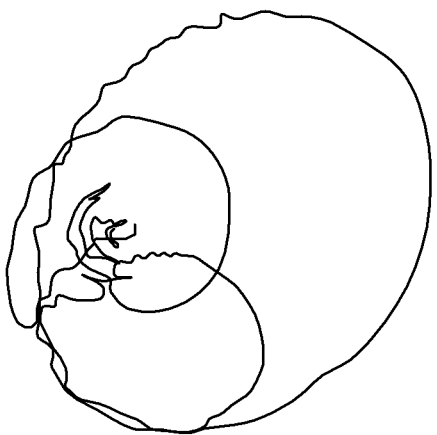
FIG. 10A-10C illustrates a comparative trajectories of exemplary motion data with respect to the noisy motion data, filtered motion data and ground truth data according to an embodiment of the disclosure.
Figure 10B:
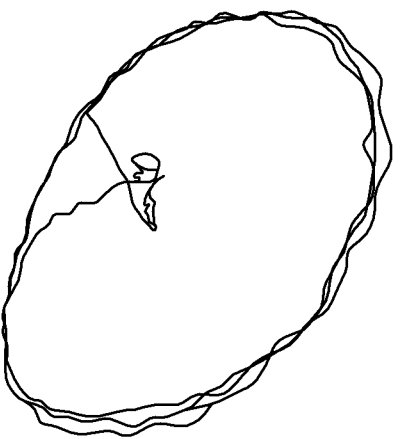
Figure 10C:
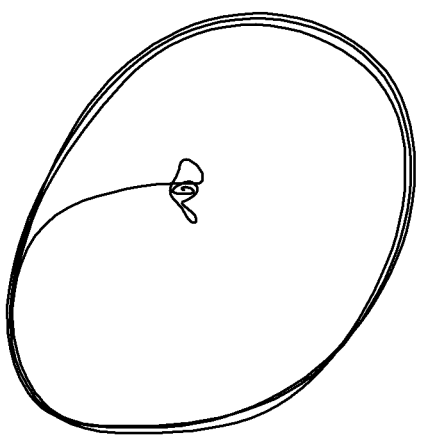

FIGS. 10A-10C illustrate a comparative trajectories of exemplary motion data with respect to the noisy motion data, filtered motion data and ground truth data according to an embodiment of the disclosure. FIG. 10A illustrates a noisy trajectory of raw motion data received from one or more motion sensors (311). The raw motion data received from one or more motion sensors (311) are high frequency data. The trajectory with Noisy motion data has a lot of drift errors. The drift errors in the motion data increases when the application changes in the HMD device (301). Also, the SLAM error such as translation error and rotation error will be high with the motion data.

FIG. 10B illustrates a trajectory of an exemplary filtered motion data. The refinement AI model, refines the raw motion data and the expected trajectory of the filtered motion data is represented in FIG. 10B. The refinement AI model corrects drift errors, translation error and rotational error caused by raw motion data. Also, the refinement AI model refines the raw motion data based on the application changes in the HMD device (301). Further, the refinement of the raw motion data drastically reduces the SLAM errors such as translational error and the rotational error. Further, the trajectory of the filtered motion data is visualized to be similar to the ground truth trajectory as shown in FIG. 10C.

Figure 11:
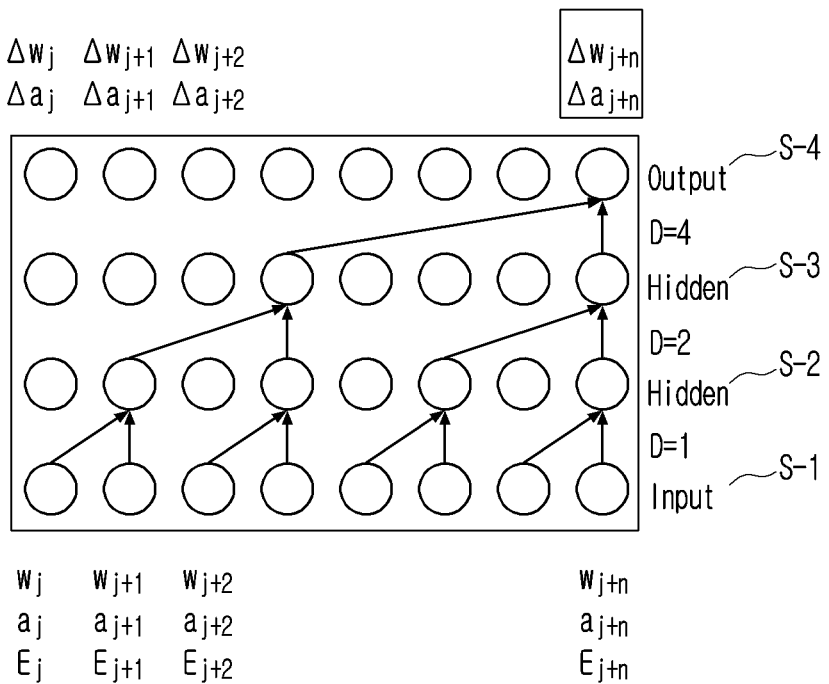
FIG. 11 illustrates a light weight neural network for refining motion data according to an embodiment of the disclosure.

FIG. 11 illustrates a light weight neural network for refining the motion data according to an embodiment of the disclosure. FIG. 11 particularly represents a dilated Convolutional Neural Network (CNN), which is used for the refinement of the AI model. The dilated CNN includes plurality of dilatations such as D1, D, D3 and D4. Each of the Dilations D1-D4 includes plurality of nodes. Each of the dilation represents the denoising of the motion data $(\omega_j, \alpha_j)$ based on the motion data represented as $(\omega_j, \alpha_j)$ and motion embedding vectors $E_j$. Particularly, in the dilation D1 denoising of the motion data $(\omega_j, \alpha_j, \omega_{j+1}, \alpha_{j+1}, \omega_{j+2}, \alpha_{j+2}, \ldots \omega_{j+n}, \alpha_{j+n})$ is initiated by inputting the motion data $(\omega_j, \alpha_j, \omega_{j+1}, \alpha_{j+1}, \omega_{j+2}, \alpha_{j+2}, \ldots \omega_{j+n}, \alpha_{j+n})$ and the motion embedding vectors $(E_j, E_{j+1}, E_{j+2}, \ldots E_{j+n})$. Further, during the dilation D2, the correction value for each of the motion data may be determined based on the embedding distance, mean motion data and gradients of motion data. Further at dilation D3, the refinement model may determine a base correction value based on the motion data $(\omega_j, \alpha_j, \omega_{j+1}, \alpha_{j+1}, \omega_{j+2}, \alpha_{j+2}, \ldots (j+n, \alpha_{j+n})$. Finally, at dilation D4, the CNN model may output the updated correction value for each of the motion data represented as $((\Delta\omega_j, \Delta\alpha_j), (\Delta\omega_{j+1}, \Delta\alpha_{j+1}), (\Delta\omega_{j+2}, \Delta\alpha_{j+2}), \ldots (\Delta\alpha_{j+n}) \Delta\alpha_{j+n}))$. Finally, the refinement model refines the motion data $(\omega_j, \alpha_j, \omega_{j+1}, \alpha_{j+1}, \omega_{j+2}, \alpha_{j+2}, \ldots \omega_{j+n}, \alpha_{j+n})$ using the determined updated correction value of the motion data.

FIG. 12 is a flow chart illustrating a method for pose estimation of a HMD device (301) in an XR environment according to an embodiment of the disclosure.

According to an embodiment, in operation 1201, the pose estimation controller (309) receives motion data (401) from one or more motion sensors (311) mounted on HMD device (301) while a user is interacting with at least one XR application. The motion data (401) includes, but is not limited, to acceleration, and angular velocity. The motion data is received from one or more motion sensors (311) associated with the HMD device (301). The motion sensors (311) may include, but is not limited to, accelerometer and gyroscope. The accelerometer provides the acceleration of the HMD device (301), and gyroscope provides the angular velocity of the HMD device (301). In some embodiments, the motion data may include the data captured by one or more motion sensors (311) associated with the users.

According to an embodiment, in operation 1203, the pose estimation controller (309), determines motion embedding vectors (403) corresponding to the at least one XR applications by inputting the received motion data and information about at least one XR application to a contrastive learning model. The motion embedding vectors represents the possible actions or motions with respect to at least one XR application running on the HMD device (301). The motion embedding vectors includes floating point numbers that represent feature values indicating size of the embedding vector. The motion embedding vectors are determined by a motion encoder (411). The motion encoder (411) determines a motion embedding vectors (403) using a contrastive learning model. The contrastive learning model initially receives the current motion data (401) and the information of the XR application 409 currently running on the HMD device (301). Further, the contrastive learning generates the one or more motion embedding vector corresponding to the received input. The motion embedding vectors indicates the possible actions or motions that the user may take while using the currently running application in the HMD device (301). The possible actions or motions may include, but is not limited to, head movements, hand movements and eye movements. For example, the possible actions or motions for the XR applications such as Microsoft Word and Microsoft excel are s hand movements and head movements. Similarly, the possible actions for dynamic XR applications such as gaming applications may include head movements, hand movements and the like. Thus, the contrastive learning will provide the one or more motion embedding vectors for all the similar applications with the respect to the currently running XR applications in the HMD device (301).

According to an embodiment, in operation 1205, the pose estimation controller (309) generates a filtered motion data based on the motion embedding vector (403) and the motion data (401). The refinement of the motion data (401) is performed by a refinement AI model. The refinement AI model is a light weight model in comparison to the contrastive learning AI model.

The refinement process of the motion data initially includes receiving the motion embedding vectors (403) from the motion encoder and the motion data (401) from the one or more motion sensors (311) associated with the HMD device (301). Further, the refinement AI model determines a mean of received motion data and a mean of received motion embedding vectors.

Furthermore, the refinement AI model determines an embedding distance between the received motion embedding vector with the mean of the motion embedding vector. Similarly, the deviation of the motion data is determined between the received motion data (401) and the mean of the motion data.

Thereafter, the refinement AI model determines a correction value for the received motion data (401). The correction value is determined based on the embedding distance, deviation of motion data and gradients of motion data. The gradients of the motion data represent the difference in refinement required due to small change in motion data. Also, the gradients represent the difference in refinement required due to small change in the motion embedding vectors (403).

Moreover, the refinement AI model updates the determined correction value based on the base correction value. The base correction value represent the correction value of the motion data determined by a base model. The base model is used to determine the correction value or the refinement value only based on past sequences of the motion data.

Finally, the refinement AI model generates the filtered motion data by summing up the updated correction value with the motion data (401).

According to an embodiment, in operation 1207, the pose estimation controller (309) estimates the poses of the HMD device (301) based on the filtered motion data. The pose estimation controller (309) estimates the poses of the HMD device (301) using the SLAM technique.

Hence, according to an embodiment of the disclosure, the motion data received from one or more motion (311) sensors are filtered based on the motion embedding vectors and the motion data.

According to an embodiment of the disclosure, the motion embedding vectors represents the possible actions or motions while using an XR application. The motion embedding vectors for the received motion data and XR application is determined using a contrastive AI learning model. The contrastive AI learning model determines a similar motion embedding vectors for the similar applications based on the received XR application.

Further, according to an embodiment of the disclosure, the refinement AI model refines the received motion data based on the motion embedding vectors and the motion data. The refinement of the motion data based on the motion embedding vectors improves the accuracy of the pose estimation. Since, the refinement of the motion data is performed based on motion embedding vectors which represents the possible actions or motions of the XR applications. Hence, the motion data is filtered based on the XR application used in the HMD device (301) and the motion data associated with the usage of the XR application.

According to an embodiment of the disclosure, the pose estimation controller (309) estimates the accurate poses for the HMD device (301) based on the filtered motion data.

Hence, according to an embodiment of the disclosure, the motion data refinement significantly improve the accuracy of motion data by minimizing errors caused by sensor drift and other sources of noise. This can lead to more reliable and precise measurements of motion, orientation, and position Further the filtered motion data improves the stability and reliability of the sensor readings by reducing the likelihood of sensor failures or errors, making it easier to obtain consistent and repeatable results.

Furthermore, the functionality of the HMD device (301) is improved through motion data refinement by providing additional information about the object's movement, such as its orientation, position and velocity. This information may be used for navigation, control and other applications.

Also, the motion data refinement may be a cost-effective solution for improving the accuracy and reliability of IMU measurements. By IMU refinement techniques, the device can achieve higher performance without the need for expensive hardware upgrades.

At least one of the plurality of modules/components of the pose estimation controller (309) may be implemented through an Artificial Intelligence (AI) model. A function associated with the AI model that is performed through the memory (307) and the processor (303). The processors (303) control the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning is performed in a device itself in which AI according to an embodiment is performed, and/or is implemented through a separate server/system.

The AI model includes neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), Deep Belief Network (DBN), bidirectional recurrent deep neural network (BRDNN), Generative Adversarial Networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

The various actions, acts, blocks, steps, or the like in the method is performed in the order presented, in a different order or simultaneously. Further, in some embodiments, some of the actions, acts, blocks, steps, or the like are omitted, added, modified, skipped, or the like without departing from the scope of the proposed method.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications are intended to be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the scope of the embodiments as described herein.

What is claimed:

1. A method for pose estimation of a Head Mounted Display (HMD) device, the method comprising:

receiving motion data from one or more motion sensors provided on the HMD device, the motion data comprising relevant motion data and irrelevant motion data acquired at a time a user is interacting with at least one extended reality (XR) application using the HMD device;

obtaining motion embedding vectors for the HMD device corresponding to the at least one XR application based on the relevant motion data corresponding to the at least one XR application;

generating a filtered motion data based on the motion embedding vectors corresponding to the at least one XR application and the motion data from the one or more motion sensors; and estimating a pose of the HMD device based on the filtered motion data.

2. The method of claim 1, wherein the motion embedding vectors are obtained by inputting, to a contrastive learning artificial intelligence (AI) model, the motion data and application information corresponding to the at least one XR application.

3. The method of claim 2, further comprises:

determining a pose error based loss between estimated pose and a ground truth pose acquired by the one or more motion sensors; and training a refinement artificial intelligence (AI) model based on the pose error based loss and the motion embedding vectors.

4. The method of claim 3, wherein the refinement AI model is a light weight model in comparison to the contrastive learning AI model.

5. The method of claim 1, wherein each of the motion embedding vectors comprises floating point numbers that represent feature value indicating size of the respective motion embedding vector.

6. The method of claim 2, wherein the application information comprises a name of the at least one XR application, a category of the at least one XR application, or a version of the at least one XR application.

7. The method of claim 2, wherein the contrastive learning AI model comprises:

obtaining a first embedding vector for a first application based on first motion data corresponding to the HMD device;

obtaining a second embedding vector for a second application based on second motion data corresponding to the HMD device;

obtaining a distance between the first embedding vector for the first application and the second embedding vector for the second application; and learning a degree of relativeness between the first application and the second application based on the distance between the first embedding vector for the first application and the second embedding vector for the second application.

8. The method of claim 3, wherein the generating the filtered motion data comprises:

inputting the received motion data and the motion embedding vectors to the refinement AI model;

determining, by the refinement AI model, at least one motion embedding distance based on average motion embedding vectors and at least one embedding vectors of plurality of applications;

determining, by the refinement AI model, at least one motion data deviation based on average of motion data received from the one or more motion sensors and the motion data received from the one or more motion sensors;

determining a motion data correction value based on the at least one motion embedding distance, the at least one motion data deviation and gradients of motion data from the refinement AI model;

determining an updated motion data correction value based on a base correction value and the motion data correction value, the base correction value determined using trained base refinement model based on previous motion data received from the one or more motion sensors; and generating, by the refinement AI model, the filtered motion data based on the motion data received from the one or more motion sensors and the updated motion data correction value.

9. A Head Mounted Display (HMD) device comprising:

a memory storing one or more instructions;

one or more motion sensors;

a processor connected to the memory and the one or more motion sensors; and a pose estimation controller connected to the processor and configured to:

receive motion data from the one or more motion sensors, the motion data comprising relevant motion data and irrelevant motion data acquired at a time a user is interacting with at least one extended reality (XR) application using the HMD device;

obtain motion embedding vectors for the HMD device corresponding to the at least one XR application based on the relevant motion data corresponding to the at least one XR application;

generate a filtered motion data based on the motion embedding vectors corresponding to the at least one XR application and motion data from the one or more motion sensors; and estimate pose of the HMD device based on the filtered motion data.

10. The HMD device of claim 9, wherein the motion embedding vectors are obtained by inputting, to a contrastive learning AI model, the motion data and application information corresponding to the at least one XR application.

11. The HMD device of claim 10, wherein the pose estimation controller is further configured to:

determine a pose error based loss between the estimated pose and a ground truth pose acquired by the one or more motion sensors; and train a refinement artificial intelligence (AI) model based on the pose error based loss and the motion embedding vectors.

12. The HMD device of claim 11, wherein the refinement AI model is a light weight model in comparison to the contrastive learning AI model.

13. The HMD device of claim 9, wherein each of the motion embedding vectors comprises floating point numbers that represent feature value indicating size of the respective motion embedding vector.

14. The HMD device of claim 10, wherein the application information about the at least one XR application comprises a name of the at least one XR application, a category of the at least one XR application, and a version of the at least one XR application.

15. The HMD device of claim 10, wherein the contrastive learning AI model is configured to:

obtain a first embedding vector for a first application based on first motion data corresponding to the HMD device;

obtain a second embedding vector for a second application based on second motion data corresponding to the HMD device;

obtain a distance between the first embedding vector for the first application and the second embedding vector for the second application; and learn a degree of relativeness between the first application and the second application based on the distance between the first embedding vector for the first application and the second embedding vector for the second application.

16. The method of claim 1, wherein the filtered motion data is obtained by providing the motion embedding vectors and the motion data as separate inputs into an artificial intelligence (AI) model.

17. The method of claim 1, wherein the filtered motion data is obtained by inputting the motion embedding vectors and the motion data into a refinement artificial intelligence (AI) model trained based on a pose error.

18. The HMD device of claim 10, wherein the filtered motion data is obtained by providing the motion embedding vectors and the motion data as separate inputs into an artificial intelligence (AI) model.

19. The HMD device of claim 10, wherein the filtered motion data is obtained by inputting the motion embedding vectors and the motion data into a refinement artificial intelligence (AI) model trained based on a pose error.

\* \* \* \* \*